United States Patent
Cain, Jr.

(10) Patent No.: US 11,058,104 B1
(45) Date of Patent: Jul. 13, 2021

(54) TURKEY HUNTING SYSTEMS AND METHODS

(71) Applicant: Big Pine Innovations, LLC, Madison, AL (US)

(72) Inventor: E. Lyle Cain, Jr., Mountain Brook, AL (US)

(73) Assignee: Big Pine Innovations, LLC, Madison, AL (US)

( * ) Notice: Subject to any disclaimer, the term of this patent is extended or adjusted under 35 U.S.C. 154(b) by 0 days.

(21) Appl. No.: 16/125,081

(22) Filed: Sep. 7, 2018

Related U.S. Application Data

(63) Continuation-in-part of application No. 15/592,993, filed on May 11, 2017, now abandoned, which is a continuation of application No. 15/138,592, filed on Apr. 26, 2016, now Pat. No. 9,661,842, which is a continuation of application No. 14/268,837, filed on May 2, 2014, now Pat. No. 9,345,240.

(60) Provisional application No. 61/818,774, filed on May 2, 2013.

(51) Int. Cl.
| | |
|---|---|
| *A01M 31/06* | (2006.01) |
| *F41H 3/00* | (2006.01) |
| *F41C 27/00* | (2006.01) |
| *F41B 5/14* | (2006.01) |

(52) U.S. Cl.
CPC .......... *A01M 31/06* (2013.01); *F41B 5/1496* (2013.01); *F41C 27/00* (2013.01); *F41H 3/00* (2013.01)

(58) Field of Classification Search
CPC .............................. A01M 31/06; F41B 5/1496
USPC .............................................................. 43/2
See application file for complete search history.

(56) References Cited

U.S. PATENT DOCUMENTS

| | | |
|---|---|---|
| 4,590,699 A | 5/1986 | Nicks |
| 4,817,579 A | 4/1989 | Mathias |
| 4,965,953 A | 10/1990 | McKinney |
| 5,522,168 A | 6/1996 | Friddle |
| 5,944,041 A | 8/1999 | Kitchens |
| 6,408,558 B1 | 6/2002 | Cornell, Jr. et al. |
| 6,487,810 B1 | 12/2002 | Loughman |
| 6,684,552 B1 | 2/2004 | Anders, III |
| 7,231,737 B2 | 6/2007 | Bradford |
| 7,828,003 B2 | 11/2010 | Montecucco |
| 8,245,436 B2 | 8/2012 | Dunkin |
| 8,701,332 B1 | 4/2014 | Chavez |
| 9,345,240 B1 | 5/2016 | Cain |

(Continued)

OTHER PUBLICATIONS

Cain, Jr., et al., U.S. Appl. No. 15/592,993, entitled, "Turkey Hunting Systems and Methods," filed May 11, 2017.

*Primary Examiner* — Christopher P Ellis

(74) *Attorney, Agent, or Firm* — Maynard Cooper & Gale, P. C.; Jon E. Holland

(57) ABSTRACT

Rather than trying to call a gobbler and waiting for the gobbler to approach, the hunter instead attempts to seek a gobbler while holding a decoy. As the hunter comes within sight of the gobbler, he can slowly move (e.g., tilt and/or rotate) the decoy so that its fan moves in a manner that mimics movement of a real turkey. It has been found that the gobbler will often fixate on the decoy failing to notice the hunter even when he is not well camouflaged. In fact, the gobbler will often approach the decoy in an aggressive manner making it much less wary than in a typical hunt where a hunter is attempting to make calls that imitate a hen. When the hunter feels that the gobbler is fixated on the decoy, he can couple the decoy to his weapon thereby freeing both of his hands for operating his weapon.

20 Claims, 30 Drawing Sheets

(56) References Cited

U.S. PATENT DOCUMENTS

| | | |
|---|---|---|
| 9,661,842 B2 | 5/2017 | Cain |
| 2003/0106253 A1 | 6/2003 | Loughman |
| 2008/0216381 A1 | 9/2008 | Wyant |
| 2011/0179691 A1 | 7/2011 | White |
| 2012/0167445 A1 | 7/2012 | Samaras et al. |
| 2012/0180371 A1 | 7/2012 | Roe |
| 2014/0130396 A1 | 5/2014 | Yaron |

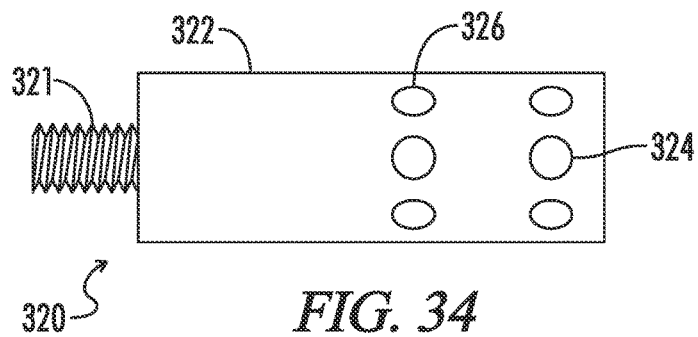
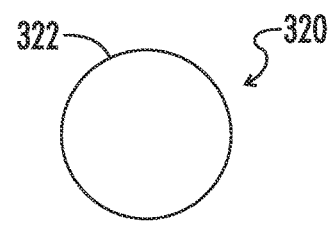
*FIG. 34*  *FIG. 35*
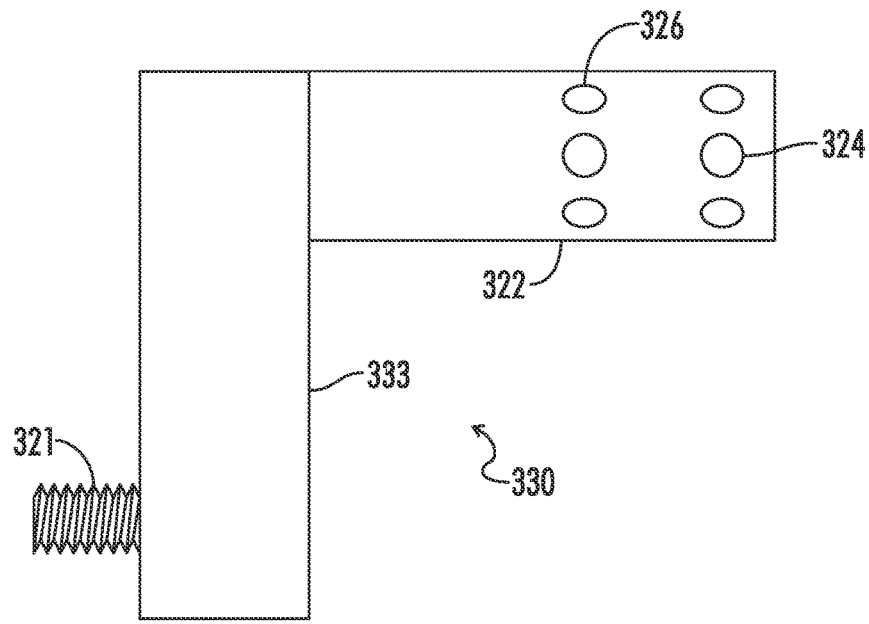
*FIG. 36*
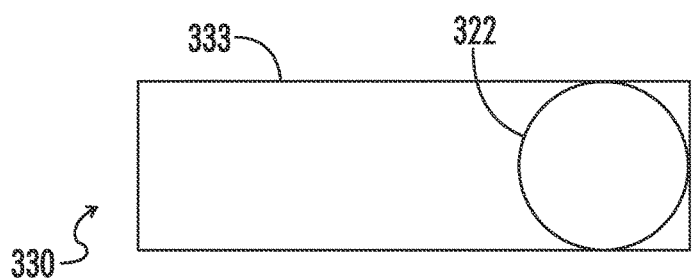
*FIG. 37*

TURKEY HUNTING SYSTEMS AND METHODS

CROSS REFERENCE TO RELATED APPLICATION

This application is a continuation-in-part of U.S. patent application Ser. No. 15/592,993, entitled, "Turkey Hunting Systems and Methods" and filed on May 11, 2017. U.S. patent application Ser. No. 15/592,993 is a continuation of U.S. patent application Ser. No. 15/138,592, entitled, "Turkey Hunting Systems and Methods" and filed on Apr. 26, 2016. U.S. patent application Ser. No. 15/138,592 is a continuation of U.S. patent application Ser. No. 14/268,837, entitled "Turkey Hunting Systems and Methods" and filed on May 2, 2014, which claims priority to U.S. Provisional Patent Application No. 61/818,774, entitled "Turkey Hunting Systems and Methods" and filed on May 2, 2013. All of the above-identified applications are incorporated herein by reference in their entirety.

BACKGROUND

In a typical turkey hunt, a hunter will use a turkey call that mimics the sounds of a hen in an effort to entice a gobbler to advance toward the call. In such situation, as the gobbler advances with the expectation of mating with a hen, the gobbler is often wary of unusual sounds or activity and can be easily frightened or startled. Indeed, it is important for the hunter to remain hidden using extensive camouflage and to generate the calls skillfully in order to fool the gobbler into believing that the calls are originating from a real hen without alerting the gobbler to the hunter's presence. Despite a hunter's best efforts and skill, it is often difficult to successfully lure a gobbler to the hunter resulting in many unsuccessful hunts.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIGS. 34 and 35 are top and front views of an embodiment of a portion of a decoy holding apparatus for a bow.

FIGS. 36 and 37 are top and front views of another embodiment of a portion of a decoy holding apparatus for a bow.

DETAILED DESCRIPTION

The present disclosure generally relates to turkey hunting systems and methods. In one exemplary embodiment, a hunter carries a turkey decoy, and a portion of the decoy (referred to as the decoy's "fan") appears similar to the feathers or "fan" of a real turkey (e.g., a gobbler). Rather than trying to call a gobbler and waiting for the gobbler to approach, the hunter instead attempts to seek a gobbler while holding the decoy in front of him. As the hunter approaches or comes within sight of the gobbler, he can slowly move (e.g., tilt and/or rotate) the decoy so that its fan moves in a manner that mimics movement of a real turkey. It has been found that the gobbler will often fixate on the decoy failing to notice the hunter even when he is not well camouflaged. In fact, the gobbler will often approach the decoy in an aggressive manner making it much less wary than in a typical hunt where a hunter is attempting to make calls that imitate a hen.

In one exemplary embodiment, the decoy is adapted for mounting on the hunter's weapon (e.g., shotgun, rifle, or bow). When the hunter feels that the gobbler is fixated on the decoy, he can couple the decoy to his weapon in order to free both of his hands for operating his weapon. The decoy is preferably configured such that, while it is coupled to the hunter's weapon, the hunter can continue to move the decoy so that its fan continues to mimic movement of a real turkey, thereby helping the hunter to move closer to the gobbler without alerting or startling it. Using such techniques, the hunter can move into a good position for shooting the turkey, increasing the likelihood that the hunt will be successful.

Figure 1:
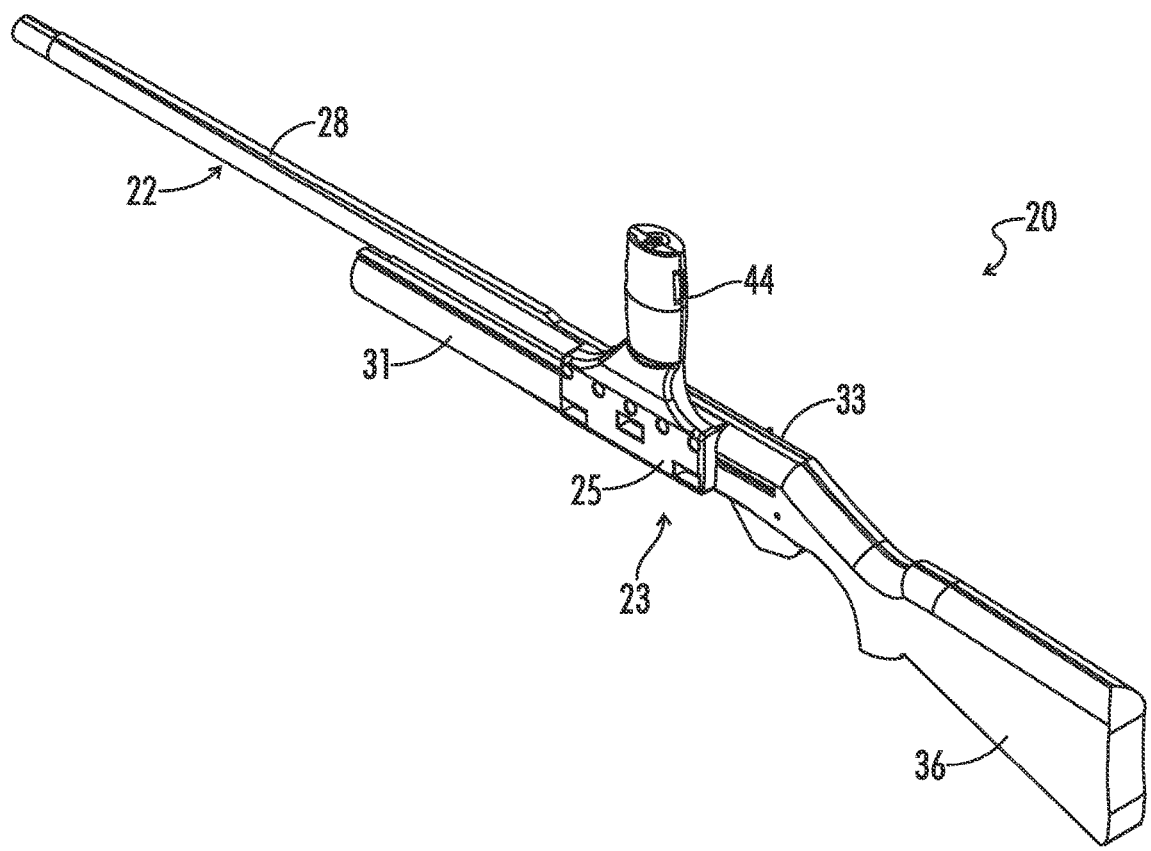
FIG. 1 is a three-dimensional perspective view illustrating a weapon system for hunting turkeys.

FIG. 1 depicts an exemplary embodiment of a weapon system 20 that can be used for turkey hunting according to the techniques described herein. As shown by FIG. 1, the system 20 comprises a weapon 22 to which a decoy articulation system 23 is coupled. In the exemplary embodiment shown by FIG. 1, the weapon 22 is implemented as a conventional shotgun having a barrel 28, a forend 31, a receiver 33, and a stock 36. As known in the art, ammunition is loaded into the receiver 33 and fired through the barrel 28 during operation. Both the receiver 33 and barrel 28 are typically metallic. In other embodiments, other types of weapons 22 are possible, such as rifles, bows, or other types of shotguns.

The decoy articulation system 23 shown by FIG. 1 has a decoy holding apparatus 25 and a removable handle 44, which will be described in more detail below. In one exemplary embodiment, the apparatus 25 is composed of plastic and has embedded magnets (not shown in FIG. 1) that are used to magnetically couple the apparatus 25 to the weapon 22. Specifically, the magnets generate magnetic fluxes that interact with metallic components of the weapon 22 (e.g., receiver 33 and/or barrel 28) in order to generate magnetic forces that hold the apparatus 25 on the weapon 22. In other embodiments, other types of materials may be used for the apparatus 25, and other types of techniques may be used to secure the apparatus 25 on the weapon 22.

Figure 2:
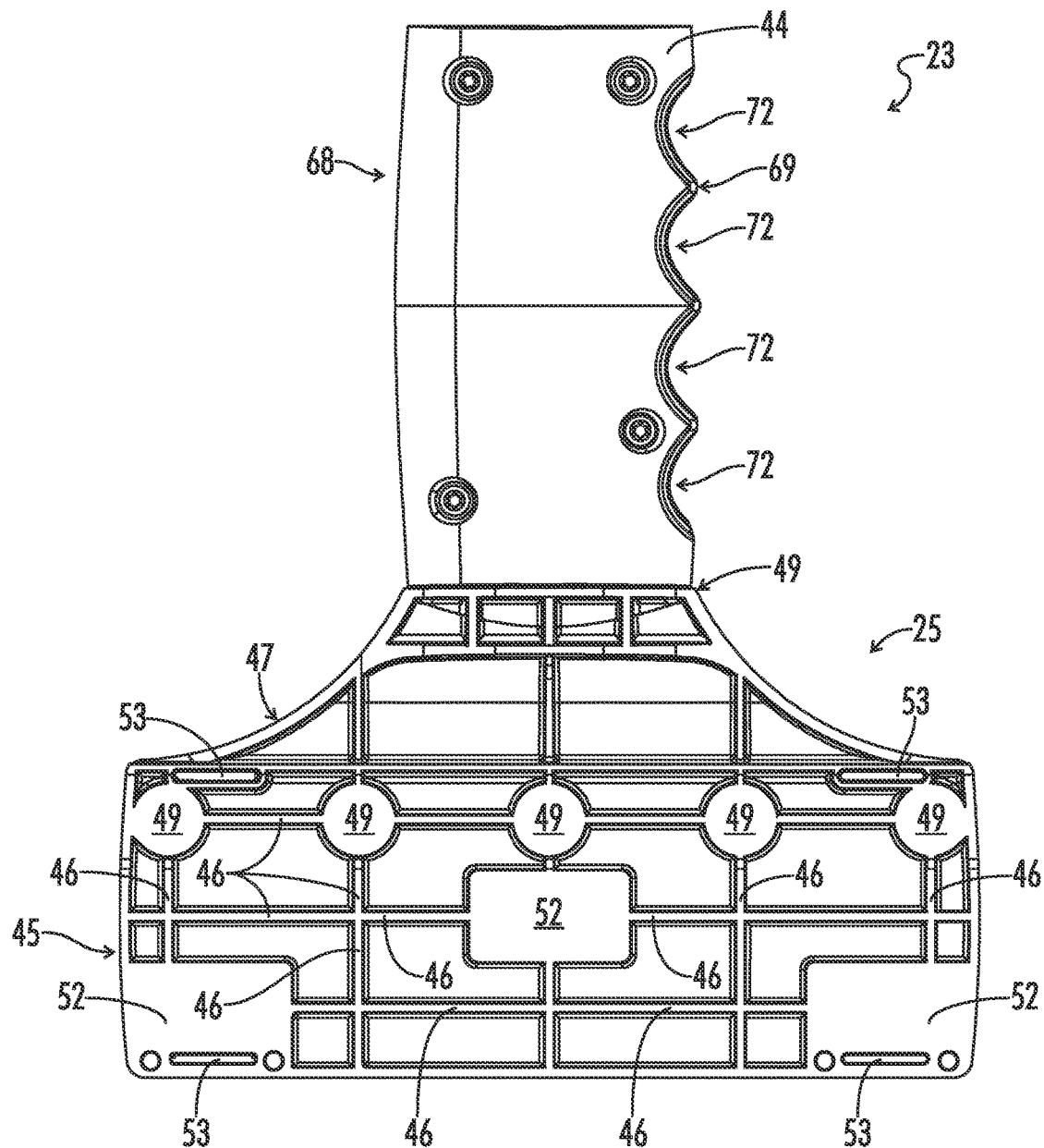
FIG. 2 is a side view illustrating a decoy articulation system having a decoy holding apparatus and a handle that is positioned on the decoy holding apparatus, such as is depicted by FIG. 1.

FIG. 2 shows a side view of the apparatus 25 while the handle 44 is coupled to the apparatus 25. The apparatus 25 has a generally rectangular base 45 that contacts the receiver 33 when the apparatus 25 is coupled to the weapon 22, as shown by FIG. 1. Extending from the rectangular base 45 is a curved support element 47 (e.g., an arm), and the top of the support element 47 forms a platform 49 on which the handle 44 rests. In other embodiments, other shapes for the base 45 and support element 47 are possible. As shown by FIG. 2, a surface of the base 45 that faces the weapon 22 has a pattern of raised ribs 46 for contacting the receiver 33.

As further shown by FIG. 2, the ribs 46 run between raised compartments 49 and 52 that hold magnets (not shown in FIG. 2). Specifically, circular compartments 49 respectively hold circular magnets (not shown) corresponding to the shape of the compartments 49, and rectangular compartments 52 respectively hold rectangular magnets (not shown) corresponding to the shape of the compartments 52. In other embodiments, other shapes of the magnets and/or compartments 49 and 52 are possible.

Figure 3:
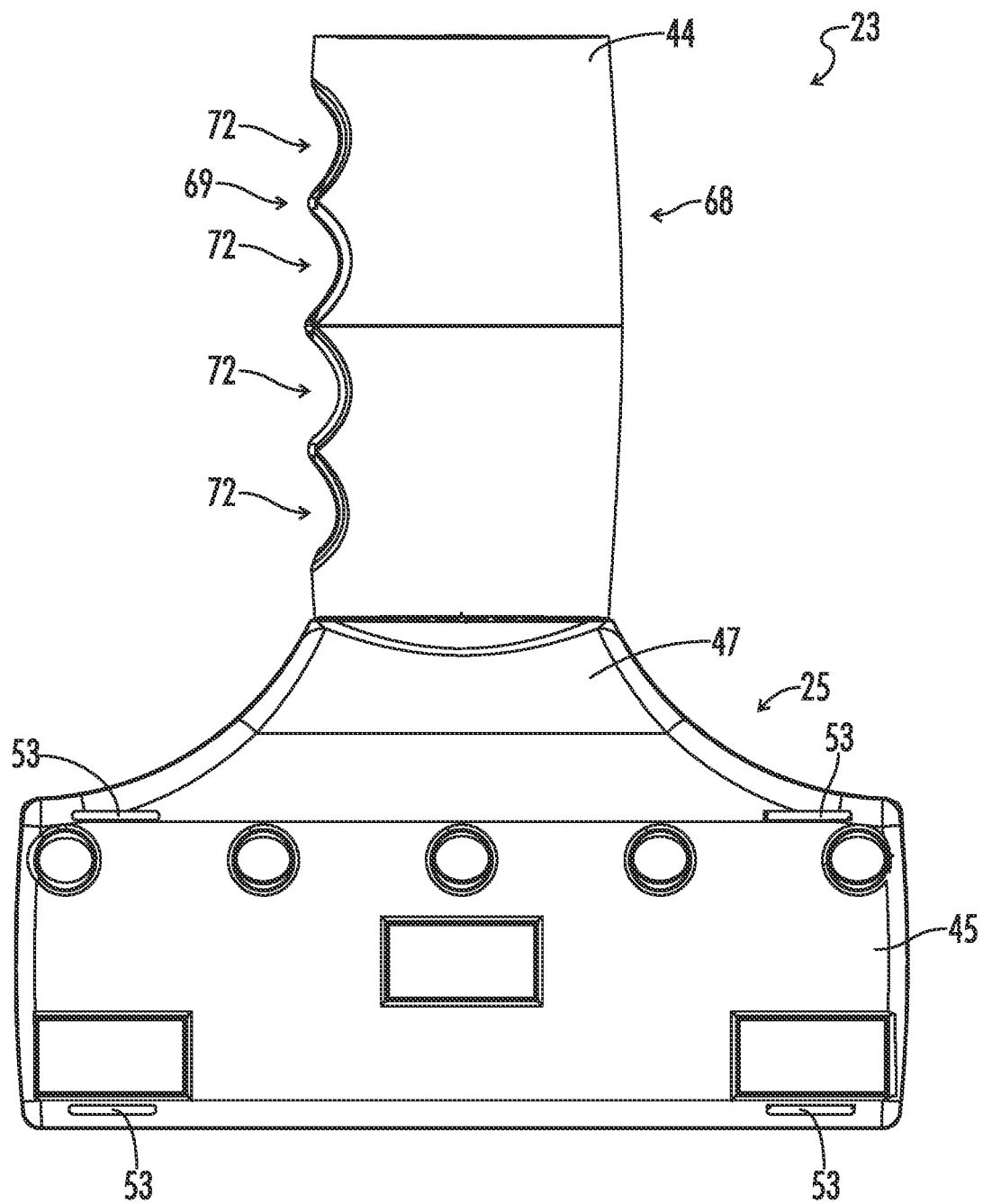
FIG. 3 is a side view illustrating the decoy articulation system depicted by FIG. 2.
Figures 4, 5:
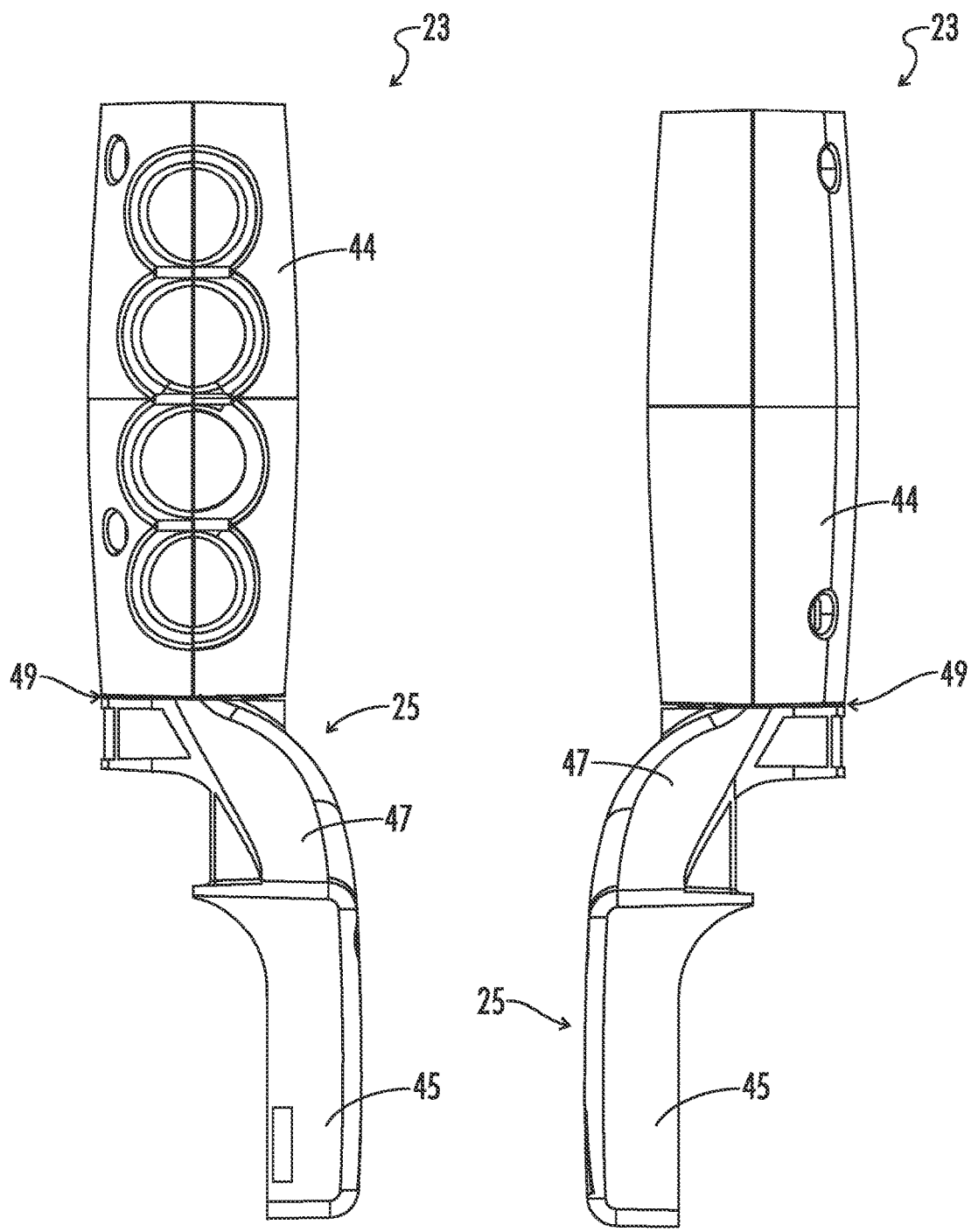
FIG. 4 is a front view illustrating the decoy articulation system depicted by FIG. 2.
FIG. 5 is a rear view illustrating the decoy articulation system depicted by FIG. 2.

As described above, the magnets in the compartments 49 and 52 generate magnetic fluxes that interact with metallic components of the weapon 22 in order to induce sufficient magnetic forces for securing the apparatus 25 to the weapon 22. If desired, the apparatus 25 can be removed from the weapon 22 by pulling the apparatus 25 with sufficient force to overcome the magnetic forces holding the apparatus 25 against the weapon 22. FIG. 3 depicts a side view of the apparatus 25 and handle 44 from a perspective opposite of that shown by FIG. 2, and FIGS. 4 and 5 show front and rear views, respectively, of the apparatus 25 and handle 44.

As shown by FIGS. 2 and 3, the base 45 has holes 53 through which straps (not shown) can be inserted in order to help secure the apparatus 25 to the weapon 22. For example, one strap can be inserted through a pair of the holes 53 and wrap around the weapon 22 for securing the apparatus 25 to the weapon 22. Further, another strap can be inserted through the other pair of holes 53 and wrap around the weapon 22 for securing the apparatus 25 to the weapon 53. It is possible to use either the straps or magnets or a combination of the straps and magnets to secure the apparatus 25 to the weapon 22.

Figure 6:
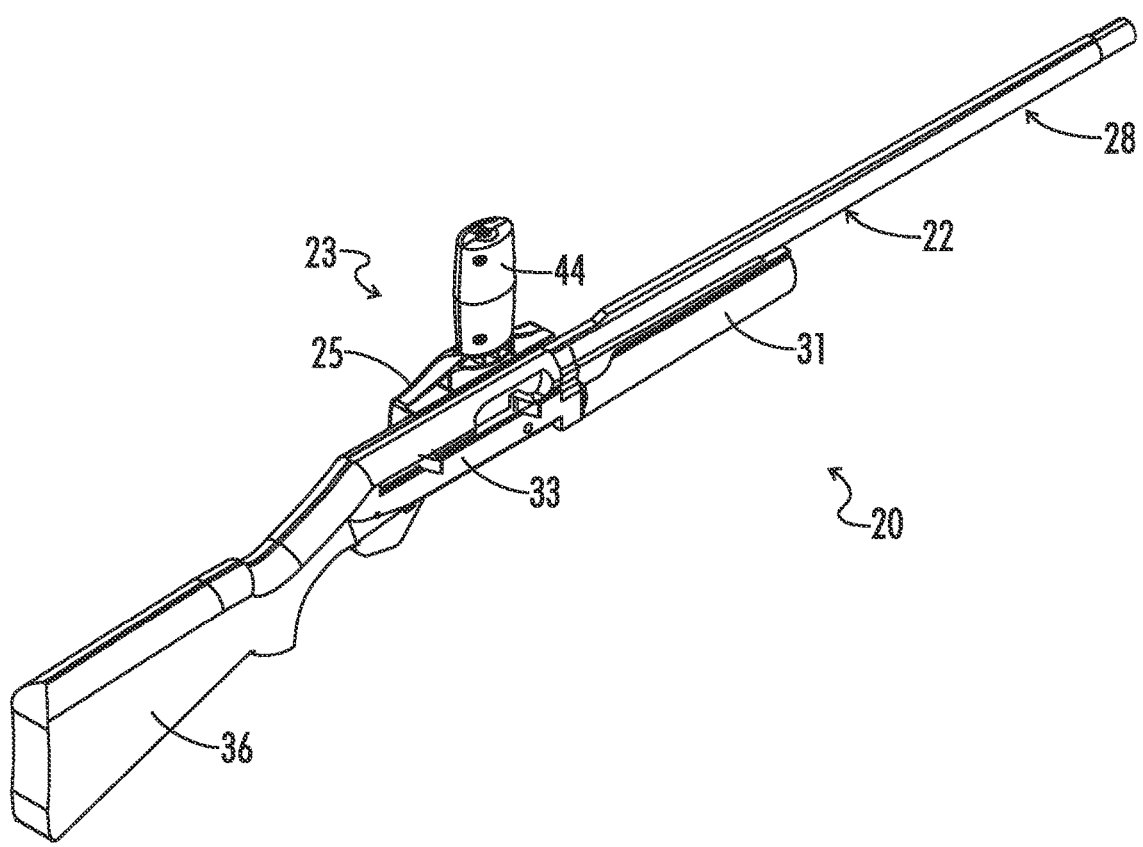
FIG. 6 is a three-dimensional perspective view illustrating the weapon system depicted by FIG. 1.
Figure 7:
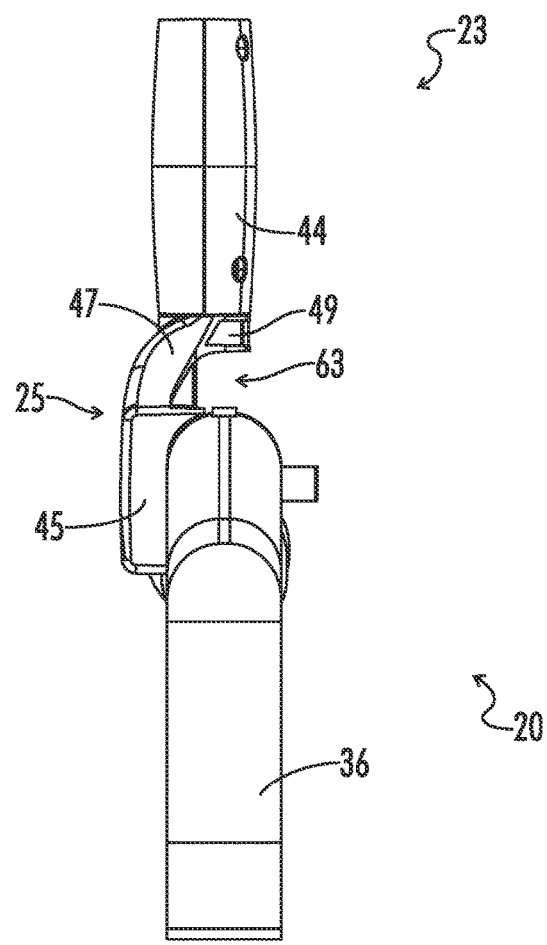
FIG. 7 is a rear view illustrating the weapon system depicted by FIG. 1.

FIG. 6 depicts a three-dimensional perspective view of the system 20, and FIG. 7 depicts a rear view of the system 20. As shown by FIG. 7, the curvature of the support element 47 provides a space 63 between the platform 49 and the weapon 22 permitting the hunter to see down the barrel 28 through the space 63, such as when the hunter has positioned the stock against his shoulder while aiming. As an example, the weapon 22 may have a front sight (not shown), e.g., a bead or blade, positioned close to the end of the barrel 28 that can be used for aiming by aligning the front sight with a target, as is known in the art. The hunter may peer through the space 63 for seeing the front sight in order to aim the weapon 22. It is possible also for a scope (not shown) to be mounted on the weapon 22 for assisting the hunter in aiming. Such scope may be positioned such that its field of view passes through the space 63 in order to see a target for aiming.

In one exemplary embodiment, the handle 44 is ergonomically shaped to easily and comfortably fit in the hand of a hunter when he has the weapon 22 positioned for firing, such as when he has the stock 36 is positioned against his shoulder. In this regard, referring to FIG. 8, which depicts a top view of the apparatus 25 and handle 44, the handle 44 has an oval cross-sectional shape, although other shapes of the handle 44 are possible in other embodiments. The side 68 of the handle 44 facing the hunter is curved and has a smooth contour so that this side 68 comfortably rests in the palm of the hunter's hand when he is holding the handle 44. The opposite side 69 of the handle 44 that faces away from the hunter has a plurality of finger grooves 72 (FIG. 2) into which the hunter's fingers may respectively fit when holding the handle 44.

Figure 8:
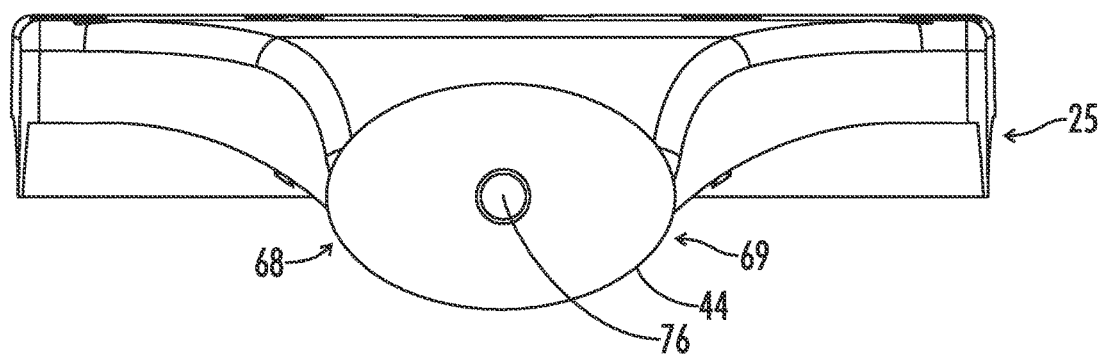
FIG. 8 is a top view illustrating the decoy holding apparatus and handle depicted by FIG. 2.
Figure 9:
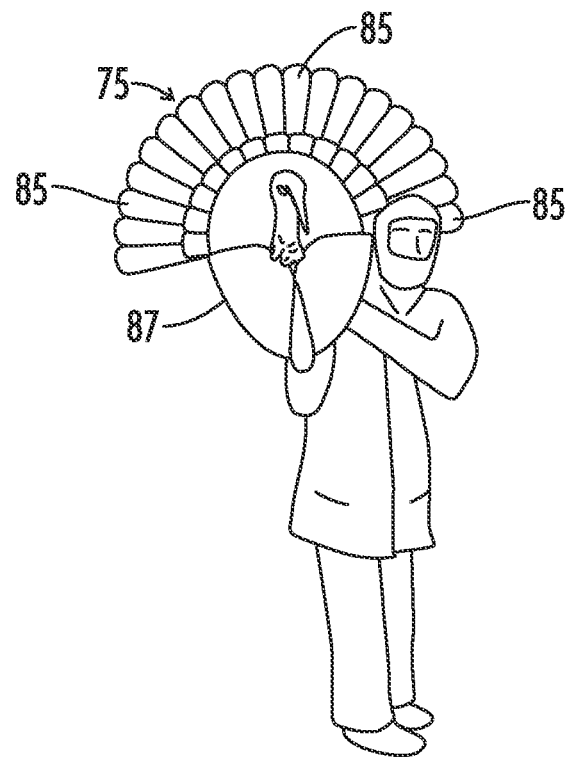
FIG. 9 illustrates a hunter carrying a conventional turkey decoy that can be modified for mounting on a weapon system, such as is depicted by FIG. 1.
Figure 10:
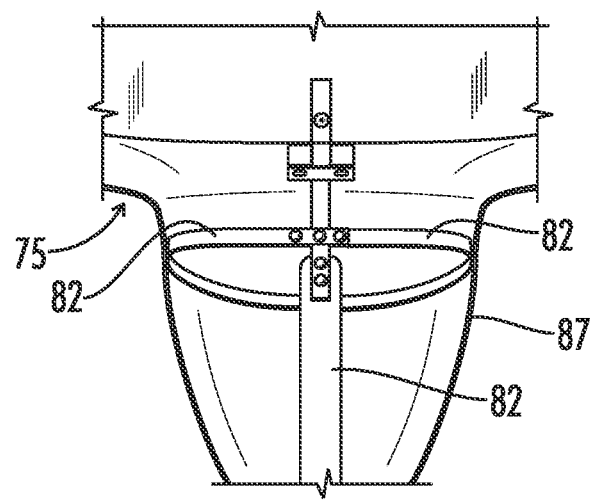
FIG. 10 is a rear view illustrating the conventional turkey decoy depicted by FIG. 9.

As shown by FIG. 8, the top of the handle 44 has a hole 76 for receiving a coupling mechanism (e.g., a screw) that could be coupled to a conventional turkey decoy 75, such as is depicted by FIG. 9. When the coupling mechanism is implemented as a screw, the surface of the hole 76 is preferably threaded for receiving such screw. As shown by FIG. 10, the decoy 75 has a frame 82 to which the screw can be coupled. Referring again to FIG. 9, the decoy 75 has a fan 85 that resembles the feathers or "fan" of a real gobbler.

Figure 11:
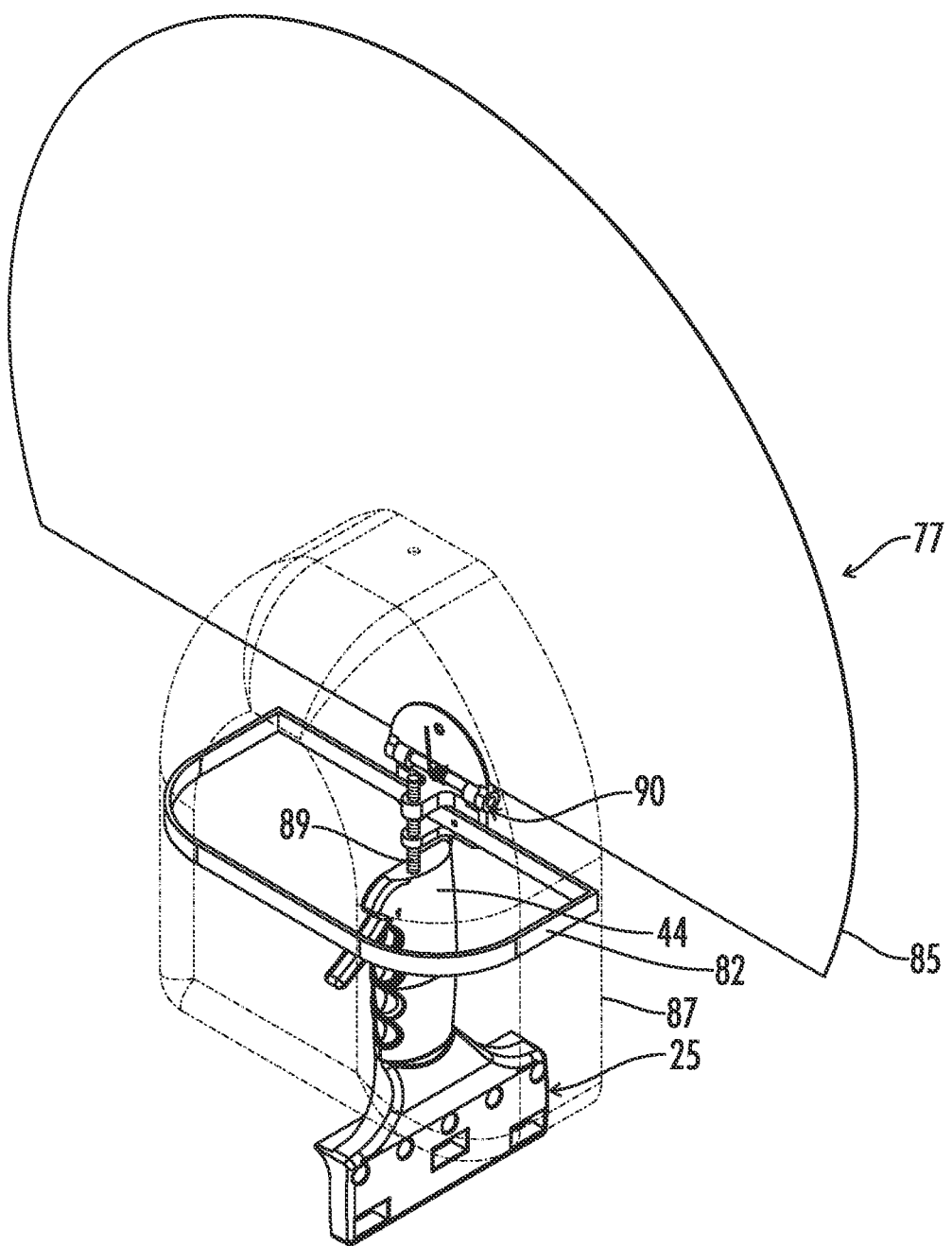
FIG. 11 is a three-dimensional perspective view of a turkey decoy that is coupled to a handle positioned on a decoy holding apparatus, such as is depicted by FIG. 2.

An exemplary embodiment of a decoy 77 is shown by FIG. 11. As shown by FIG. 11, the decoy 77 has a hollow body 87 that is coupled to a fan 85. The decoy 77 may be formed by modifying a conventional decoy 75 to include a coupling mechanism for coupling the decoy 75 to the handle 44. The front surfaces of the body 87 and fan 85 may be shaped to resemble a real turkey, like the conventional decoy 75 shown by FIG. 9, but such shaping is not shown in FIG. 11 for simplification. As shown by FIG. 11, the decoy 77 has a coupling mechanism 89 that is coupled to a hinge 90 mounted on the decoy's frame 82. In the embodiment depicted by FIG. 11, the coupling mechanism 89 is implemented as a screw, but other types of coupling mechanisms are possible in other embodiments. Further, the decoy 77 is coupled to the handle 44 by inserting (e.g., screwing) the coupling mechanism 89 into the hole 76 (FIG. 8) in the top surface of the handle 44. As will be described in more detail hereafter, the fan 85 can be tilted in order to resemble fan movements of a real turkey without changing the orientation of the body 87.

Figure 12:
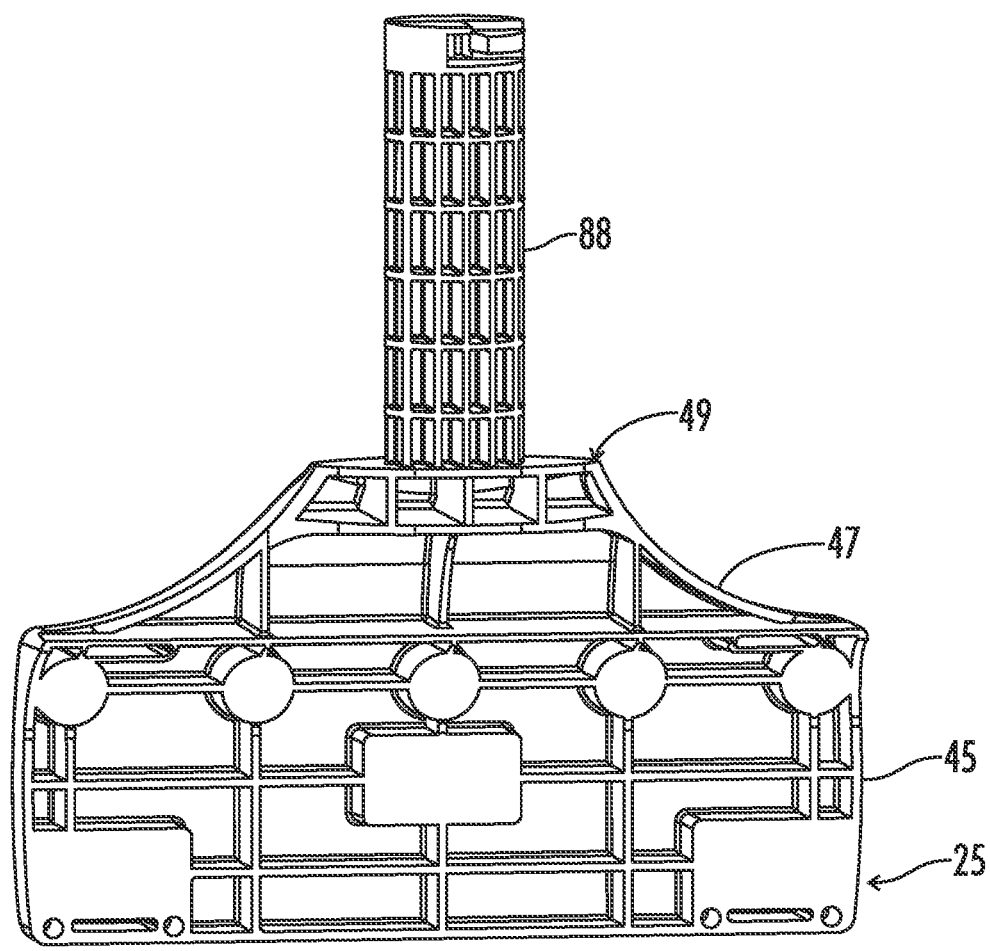
FIG. 12 is a side view illustrating the decoy holding apparatus depicted by FIG. 2 with the handle removed from the decoy holding apparatus.
Figure 13:
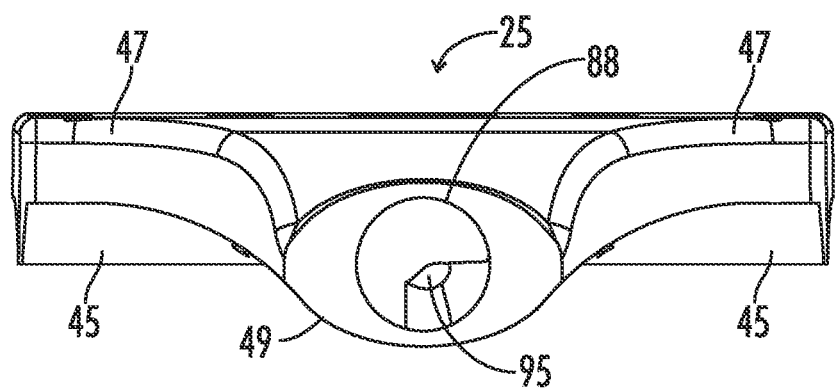
FIG. 13 is a top view illustrating the decoy holding apparatus depicted by FIG. 12.
Figure 14:
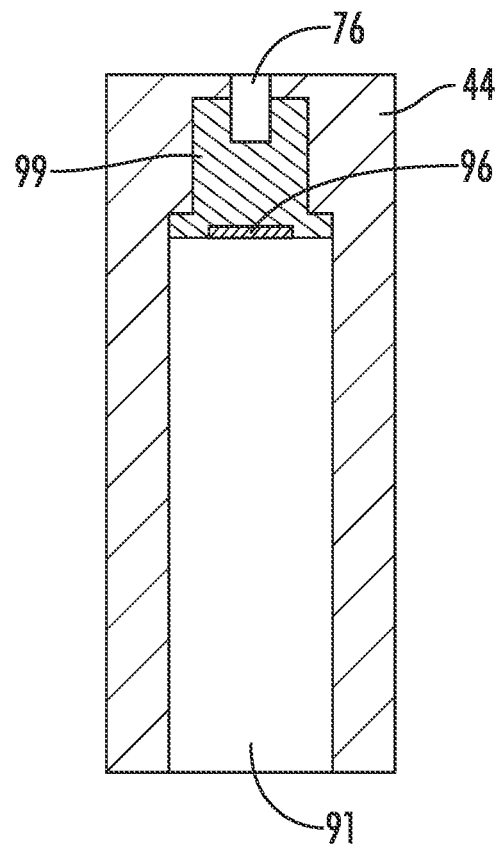
FIG. 14 is a cross-sectional view illustrating a handle and an insert of a decoy holding apparatus, such as is depicted by FIG. 2.
Figure 15:
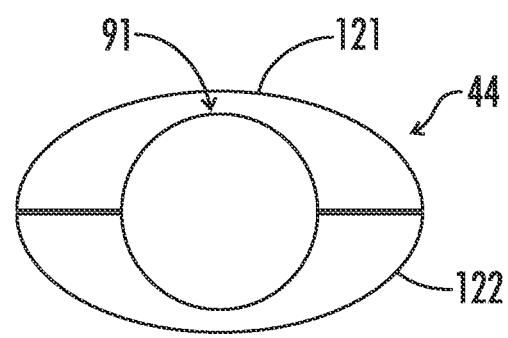
FIG. 15 is a bottom view illustrating the handle depicted by FIG. 2.

FIGS. 12 and 13 depict the decoy holding apparatus 25 when the handle 44 has been removed therefrom. The apparatus 25 has an insert 88 that extends upward from the platform 49 formed by the top of the support element 47. In one exemplary embodiment, the insert 88 is cylindrical, but other shapes are possible in other embodiments. As shown by FIGS. 14 and 15, the bottom of the handle 44 has a hole 91 for receiving the insert 88. In this regard, when a hunter desires to mount the decoy 77 on the weapon 22, the hunter moves the decoy 77 relative to the apparatus 25 such that the insert 88 is inserted into the hole 91 until the decoy 77 rests on the apparatus 25. Having the insert 88 inserted into the hole 91 helps to prevent the decoy 77 from falling off of the apparatus 25. Thus, after positioning the decoy 77 on the apparatus 25, the hunter can release the decoy 77 thereby freeing both of his hands for operating the weapon 22.

In one exemplary embodiment, a magnet 95 (FIGS. 13 and 14) is embedded in the top end of the insert 88. In addition, as shown by FIG. 14, the handle 44 has a magnet 96 that comes in close proximity to the magnet 95 when the handle 44 is positioned on the holding apparatus 25 such that a magnetic force is generated for attracting one magnet to the other. Such force helps to hold the decoy 77 in position unless the hunter provides a sufficient force for moving the decoy 77 in a desired manner, such as lifting the handle 44 off of the apparatus 25. The use of the magnets 95 and 96 helps to keep the handle 44 secured to the apparatus 25 and, specifically, the insert 88 helps to prevent rattling noises that could otherwise result from jostling of the handle 44 relative to the insert 88.

In one exemplary embodiment, the handle 44 is manufactured by inserting into the hole 91 an insert 99 having the magnet 96 such that it is positioned at the top of the handle 44, as shown by FIG. 14. The hole 76 for receiving a coupling mechanism (not shown in FIG. 14) that couples the handle 44 to the decoy 77 passes through a wall of the handle 44 and the insert 99. As described above, the surface of the hole 76, including a portion of the surface formed by the insert 99, may be threaded. When the handle 44 is mounted on the decoy holding apparatus 25, the insert 88 of the decoy holding apparatus 25 contacts the insert 99 of the handle 44 such that the magnets 95 and 96 are in close proximity to one another.

In addition, referring to FIG. 15, the handle 44 may also be manufactured by joining two portions 121 and 122 (e.g., halves) of a plastic casing or a casing of other types of materials. The insert 99 may be positioned in one of the portions 121 or 122, as shown by FIG. 14, before the portions 121 and 122 are joined during manufacturing.

While the decoy 77 is positioned on the apparatus 25, the hunter can attempt to move the decoy 77 so that it simulates movement of a real gobbler. As an example, the hunter can grasp the handle 44 and rotate the handle 44 about the insert 88 thereby causing the decoy 77 to rotate in a like manner. Also, the hunter can move the weapon 22 on which the decoy 77 is mounted, thereby causing the decoy 77 to similarly move. In addition, in one exemplary embodiment, the decoy 77 is coupled to a trigger that the hunter can move in order to cause the decoy 77 and, specifically, the decoy's fan 85 to tilt forward and backward. Such trigger can be coupled to at least one pulley (not shown) to cause the tilting motion. In other embodiments, other techniques for moving the decoy 77 are possible.

Figure 16A:
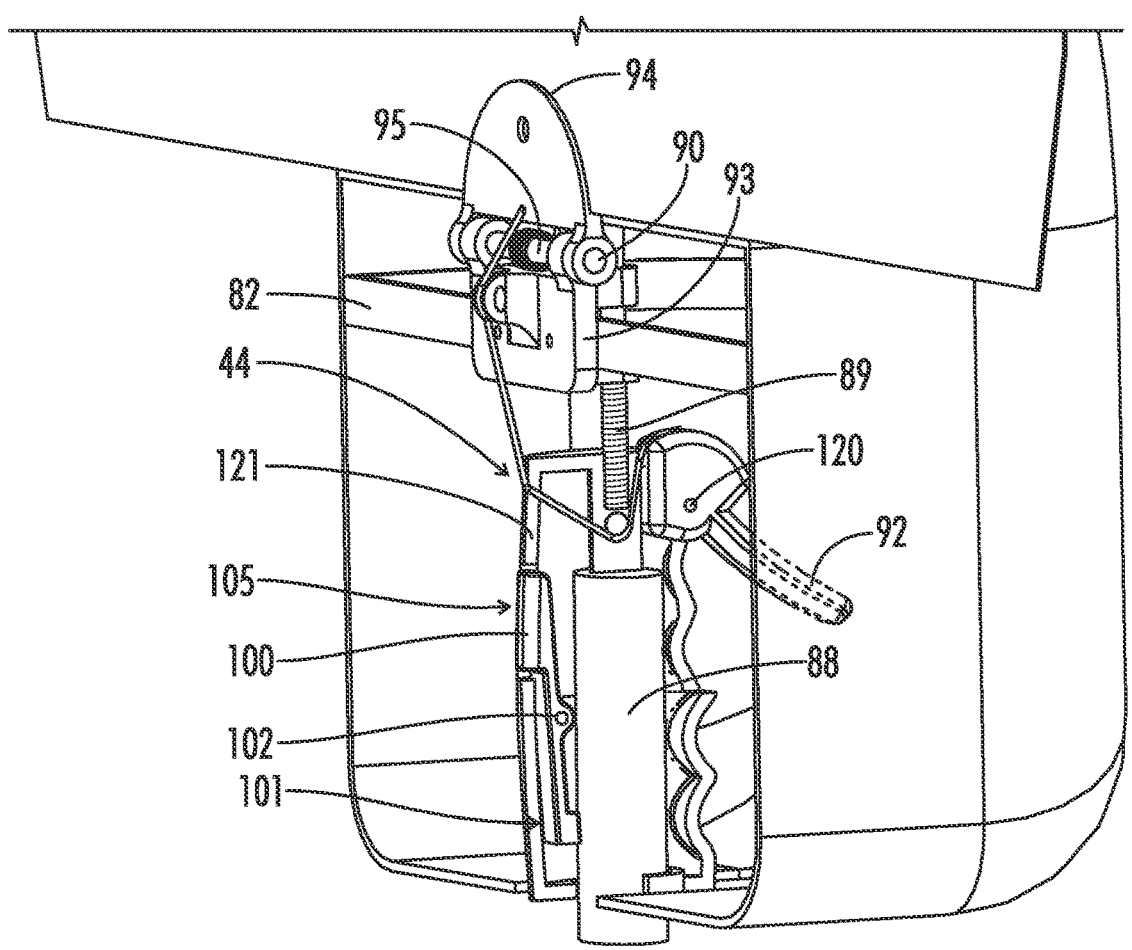
FIGS. 16A and 16B depict a handle mounted on an insert of a decoy holding apparatus, such as is depicted by FIG. 2, while the handle is coupled to a turkey decoy.
Figure 16B:
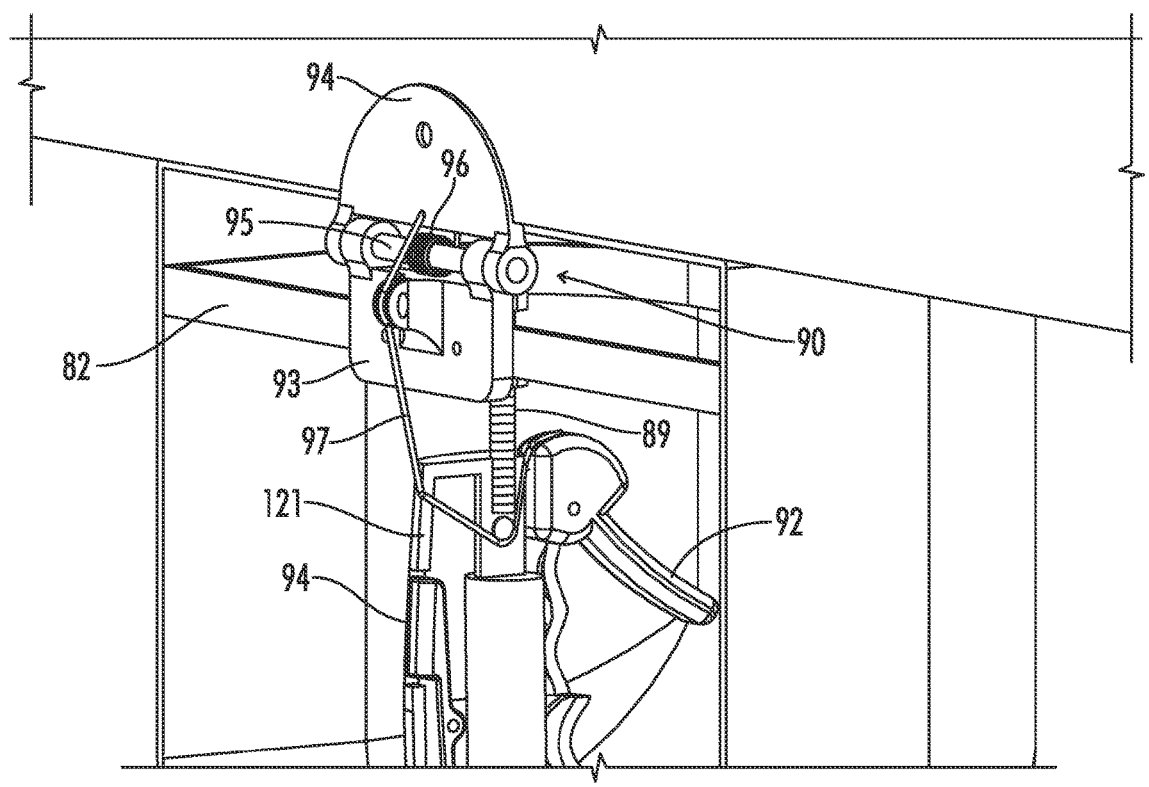
Figure 17:
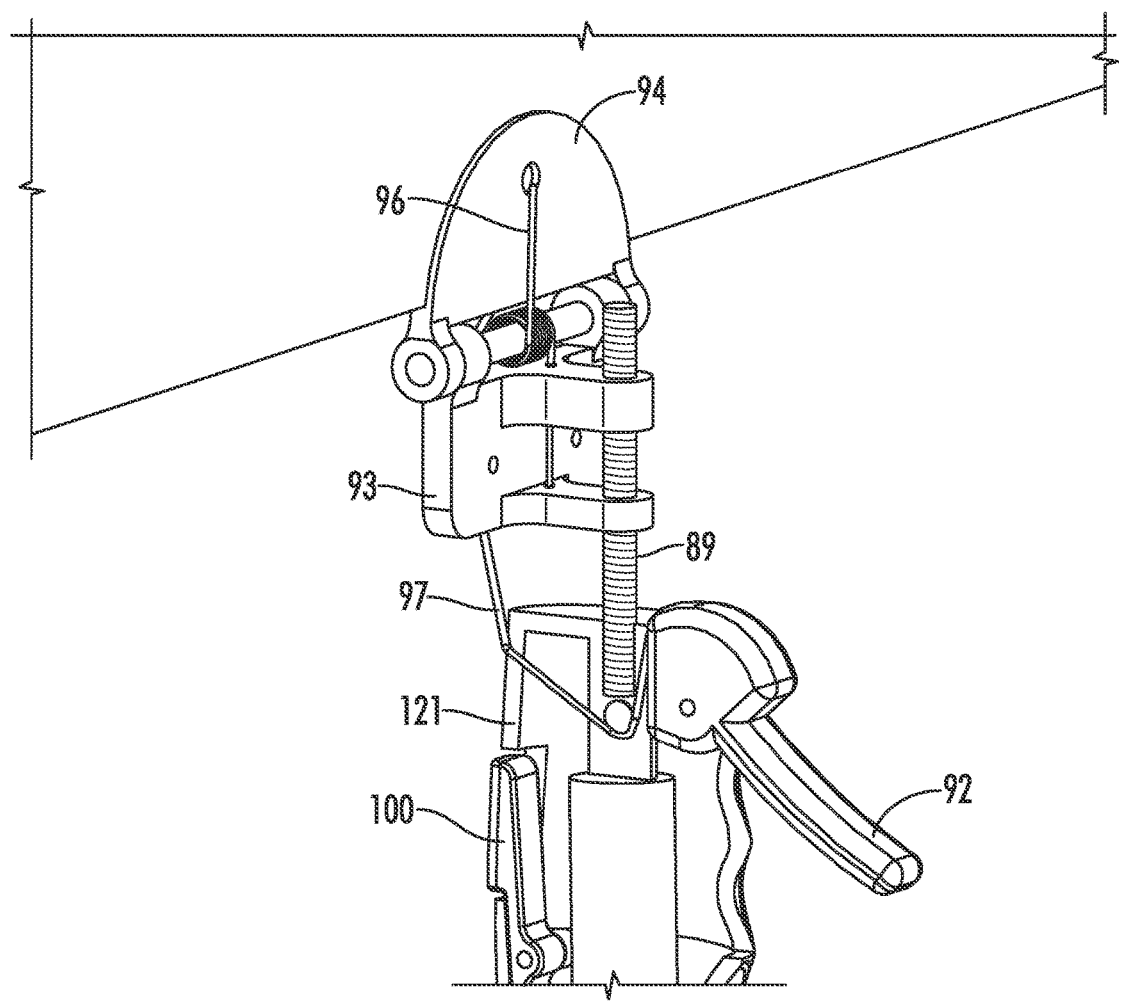
FIG. 17 depicts the handle depicted by FIG. 16A.
Figure 18:
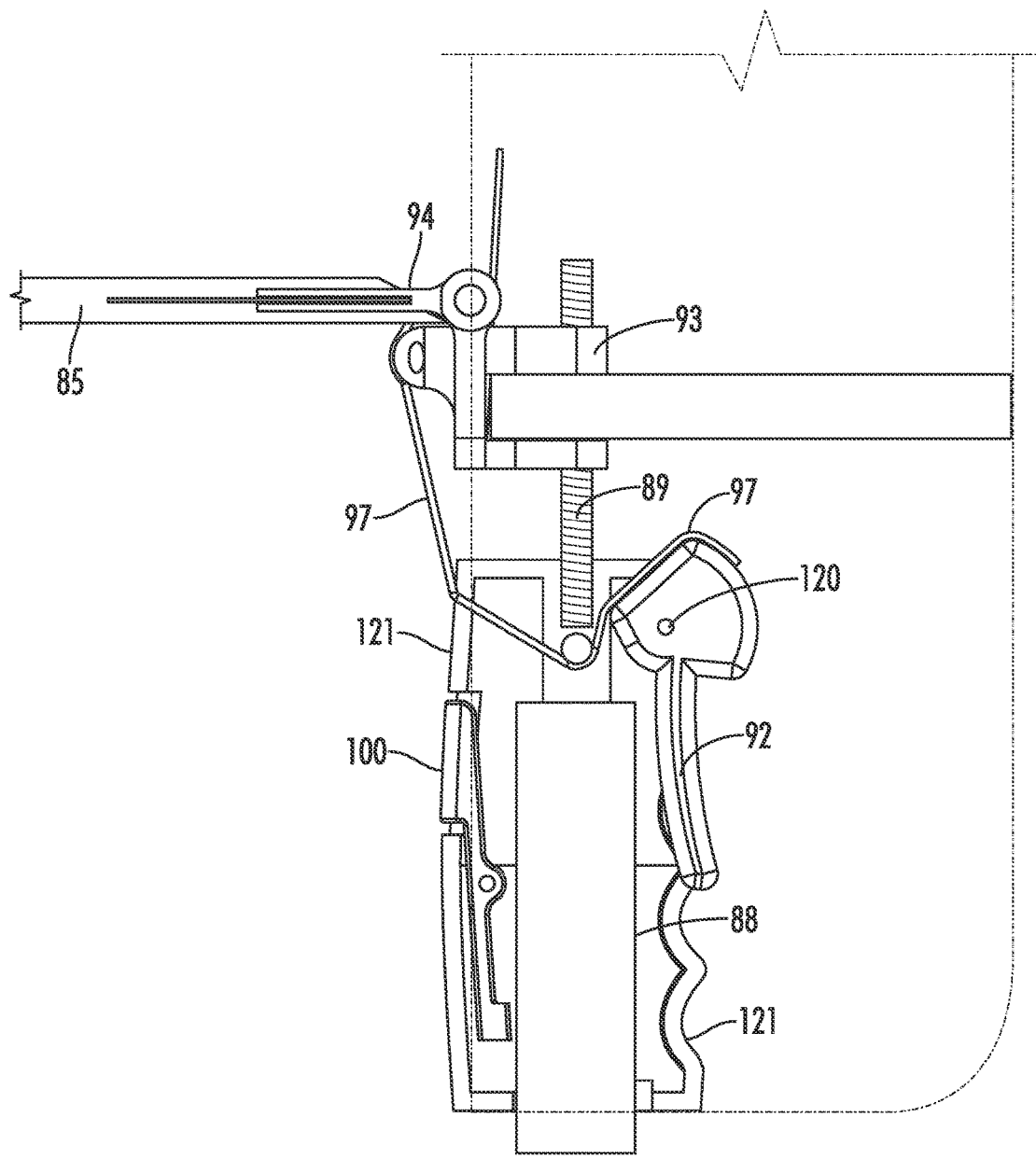
FIG. 18 is a side view illustrating the handle depicted by FIG. 16A.

FIGS. 16A, 16B, 17, and 18 depict an exemplary embodiment of a decoy 77 that is mounted on a handle 44 for permitting the decoy 77 to tilt via actuation of a trigger 92. Note that, in FIGS. 16A, 16B, 17, and 18, the handle 44 is shown with the portion 122 removed for illustrative purposes in order to show components normally hidden within the handle 44. As shown by FIGS. 16A and 16B, the decoy's hinge 90 is mounted on a frame bracket 93 that is coupled the frame 82. The hinge 90 has a pin 95 that is coupled to the frame bracket 93 and a fan bracket 94, and the fan bracket 94 pivots about the pin 95. The fan bracket 94 is coupled to the fan 85 such that movement of the fan bracket 94 causes a corresponding movement of the fan 85. The brackets 93 and 94 are coupled to a spring 96, which applies a force for maintaining the fan 85 in an upright position, as shown by FIG. 11. The trigger 92 is coupled to the fan bracket 94 via a cable 97. To tilt the fan 85, the hunter can press the trigger 92 causing it to rotate about a pin 120 (FIG. 18) clockwise relative to the perspective shown by FIG. 16B. Such rotation causes the cable 97 to pull the fan bracket 94, thereby causing the fan bracket 94 and, hence, the fan 85 to pivot about the pin 95. Such rotation tilts the fan 85 backward. FIG. 18 shows the decoy 77 after the fan 85 has been rotated 90 degrees backward via actuation of the trigger 92.

When the trigger 92 is released, the force of the spring 96 forces the fan bracket 94 and, hence, the fan 85 to pivot about the pin 95 until the fan 85 reaches the upright position shown by FIG. 11. The movement of the fan 85 back to the upright position also creates a force applied to the trigger 92 through the cable 97 that causes the trigger 92 to rotate counterclockwise back to its original position prior to actuation. Note that the hunter can modulate the trigger 92 by applying varying levels of force to the trigger 92 to cause the fan 85 to rotate back and forth in order to simulate typical fan movement by real turkeys.

In one exemplary embodiment, the handle 44 has a locking mechanism 100 (FIG. 16A) for locking the handle 44 depending on whether it is being gripped by the hunter. In this regard, when the handle 44 is gripped by the hunter, the locking mechanism 100 is deactivated such that it does not prevent movement of the handle 44 and, hence, the decoy 77 that is coupled to the handle 44. Releasing the handle 44 activates the locking mechanism 100 such that it prevents the handle 44 and, hence, the decoy 77 from moving relative to the insert 88 and, hence, the weapon 22.

In the embodiment depicted by FIG. 16A, the mechanism 100 is spring loaded such that it is pressed against the insert 88 when the hunter is not gripping the handle 44. Specifically, a spring (not shown) positioned at an end 101 generates a force on the locking mechanism 100 causing it to pivot about a pin 102 such that the locking mechanism 100 is pressed against the insert 88. In such position, frictional forces between the insert 88 and the locking mechanism 100 prevent the handle 44 from moving and, specifically, rotating about the insert 88.

When the hunter grips the handle 44, the hunter's hand presses against the opposite end 105 of the locking mechanism 100. The force exerted by the hunter's hand on the locking mechanism 100 causes it to pivot about the pin 102 such that the locking mechanism 100 disengages the insert 88. In such case, the locking mechanism 100 is separated from the insert 88 allowing the handle 44 to rotate about the insert 88. Once the hunter releases the handle 44 and, hence, the locking mechanism 100, the force of the spring at the end 101 pushes the locking mechanism 100 against the insert again 88, thereby locking the handle 44.

An exemplary use and operation of the system 20 will now be described in detail with particular reference to FIG. 19.

Figure 19:
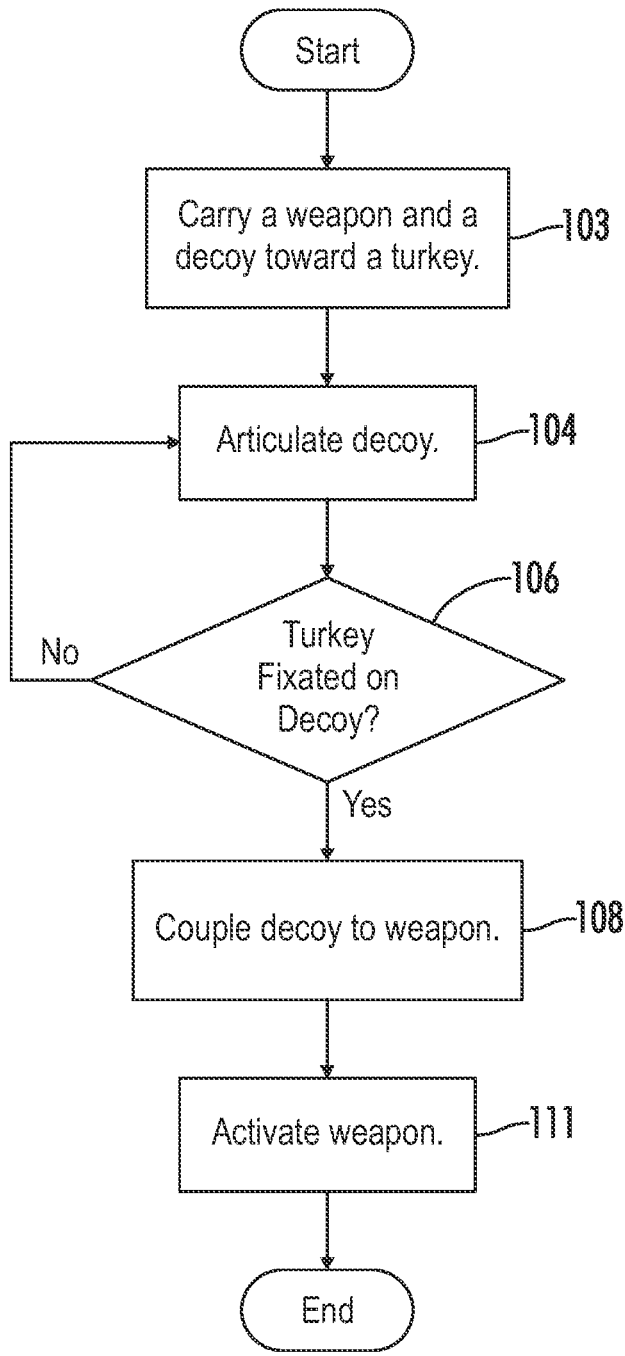
FIG. 19 is a flow chart illustrating an exemplary method for hunting turkeys.

Initially, a hunter begins a turkey hunt by carrying both the weapon 22 and the decoy 77, which is coupled to the handle 44, toward a turkey as shown by block 103 of FIG. 19. As described above, the decoy holding apparatus 25 is secured to a weapon 22, but it is unnecessary for the decoy 77 to be mounted on the apparatus 25 at this point. Rather than attempting to call gobblers to the hunter's location, the hunter may instead attempt to find and approach gobblers by positioning the decoy 77 in front of him, as will be described in more detail below. To help find a gobbler, the hunter may use a conventional turkey call to which gobblers may respond. Once a gobbler has been located and is in sight of the hunter, the hunter preferably positions the decoy 77 so that it at least partially occludes the hunter from the gobbler's sight. Specifically, the hunter 77 holds the handle 44 such that the decoy 77 is in front of the hunter's face, and he may view the gobbler around the edges of the decoy 77.

While approaching the gobbler, the hunter preferably articulates the decoy 77 slightly, rotating and/or tilting the decoy 77, in an attempt to simulate movement of a real gobbler, as shown by block 104 of FIG. 19. As described above, it is expected that the gobbler will fixate on the decoy 77 and exhibit an aggressive type of behavior making the gobbler less wary of dangers, such as the hunter, that could otherwise startle the gobbler. Once the hunter believes the gobbler is fixated on the decoy 77 and the hunter is close to a good position for taking a shot at the gobbler, the hunter couples the decoy 77 to the holding apparatus 25 and, hence, the weapon 22 by mounting the handle 44 on the support element 47 such that the insert 88 is inserted into the hole 91 in the bottom of the handle 44, as shown by blocks 106 and 108 of FIG. 19.

While the decoy 77 is on the apparatus 25 and the hunter is holding the handle 44, the hunter may continue to move the decoy 77 (e.g., rotating and/or tilting the decoy 77) by turning the handle 44 and/or activating (e.g., pressing) the trigger 92. Once the hunter is ready to take a shot, he may release the handle 44 such that both of his hands are free to operate the weapon 22. Peering down the barrel 28 through the space 63, the hunter may aim the weapon 22 at the gobbler and then activate (e.g., fire) the weapon 22 in an effort to wound the gobbler, as shown by block 111 of FIG. 19. In this regard, while aiming at the gobbler, the hunter activates the weapon 22 by pulling the weapon's trigger such that ammunition is discharged through the barrel. If a bow is used instead, the hunter may activate the bow such that it launches an arrow toward the gobbler. Note that the hunter and, specifically, the hunter's face remains at least partially occluded from the gobbler's view by the decoy 77 while the hunter is aiming at the gobbler.

Use of the decoy 77, as described above, helps the hunter to approach gobblers without having to try to call the gobblers to the hunter, thereby increasing the probability that the hunt will be successful. In addition, the hunting techniques described herein allow the hunter to actively seek and approach gobblers challenging the hunter to move the decoy 77 in a manner that simulates movements of real gobblers. Many hunters may find such techniques to be more enjoyable relative to typical turkey hunts for which hunters usually call and then wait for gobblers to approach.

Figure 20:
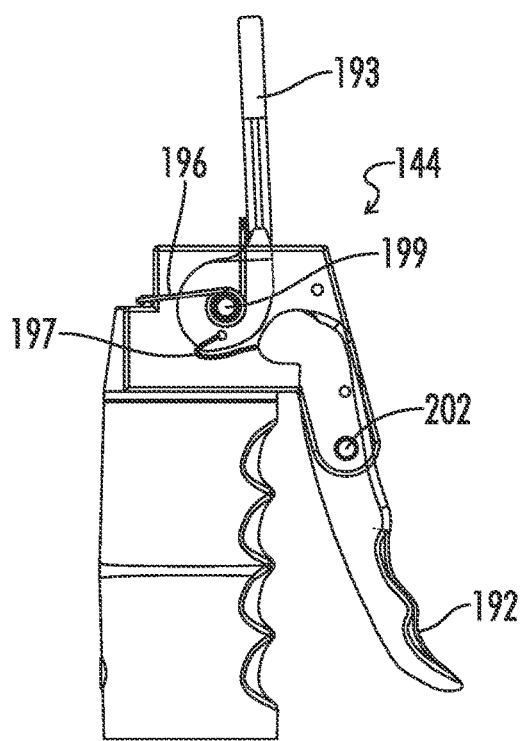
FIG. 20 is a side view illustrating a handle that can be positioned on a decoy holding apparatus.
Figure 21:
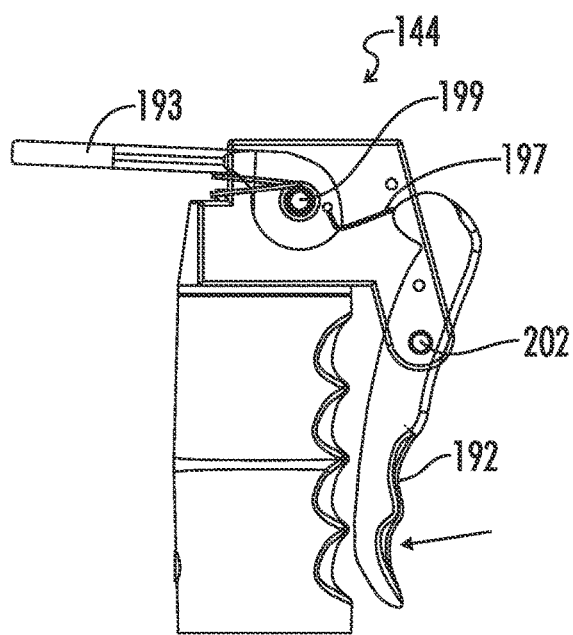
FIG. 21 is a side view illustrating the handle depicted by FIG. 20 after a trigger has been actuated.

FIGS. 20 and 21 depict another exemplary embodiment of a handle 144 similar to the handle 44 described above. As shown, the handle 144 has a fan bracket 193 on which a fan 85 of a decoy 77 is mounted as described above for the fan bracket 94 depicted by FIG. 16A. The fan bracket 193 is coupled to a spring 196 that tends to force the fan bracket 193 into the upright position shown by FIG. 20. The fan bracket 193 is rotatable about a pin 199 and is coupled to a trigger 192 via a cable 197. The trigger 192 is rotatable about a pin 202. Note that portions within the handle 144, such as the pin 199, the bottom of the fan bracket 193, the spring 196, the cable 197, and a portion of the trigger 192 are normally hidden from view but are shown in FIGS. 20 and 21 for illustrative purposes.

When a user presses the trigger 192 thereby causing the trigger 192 to rotate in the clockwise direction in the embodiment shown by FIG. 20, the trigger 192 pulls the bracket 193 via the cable 192 causing the fan bracket 193 to rotate about the pin 199 in the counter-clockwise direction, as shown by FIG. 21. Such movement of the fan bracket 193 causes the fan 85 to tilt. When the user releases the trigger 192, the force from the spring 196 causes the fan bracket 193 to rotate in the opposite direction returning the fan bracket 193 to the position shown by FIG. 20.

Note that the handle 144 shown by FIG. 20 may be mounted on the decoy holding apparatus 25 shown by FIG. 12 by inserting the insert 88 into the handle 144, as described above for the handle 44. Thus, like the handle 44 shown by FIG. 2, the handle 144 shown by FIG. 20 may rotate about the insert 88. Such rotation in conjunction with the movement of the fan bracket 193 permits three-dimensional rotation of the fan 85.

Figure 22:
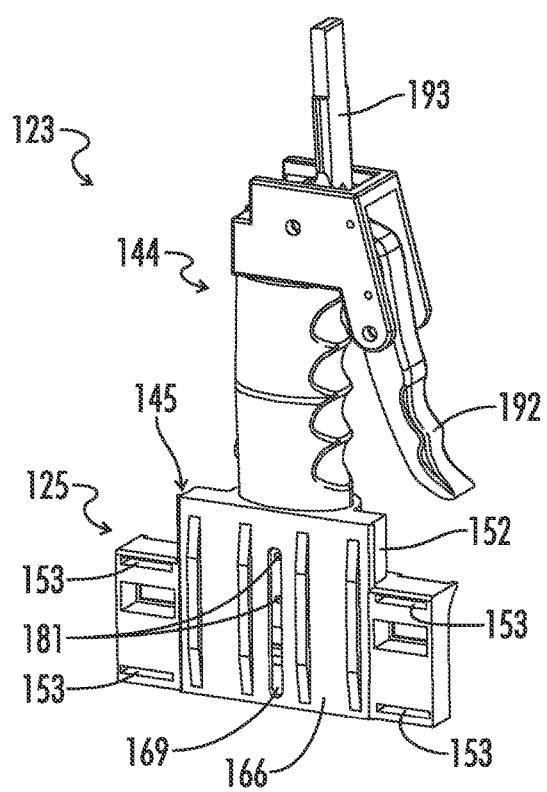
FIG. 22 is a three-dimensional perspective view illustrating a decoy articulation system having the handle depicted by FIG. 20 mounted on a decoy holding apparatus.

FIG. 22 depicts a decoy articulation system 123 having the handle 144 of FIG. 20 mounted on a decoy holding apparatus 125 that is similar to the decoy holding apparatus 25 of FIG. 12 except as will be further described below. The decoy holding apparatus 125 has a base 145 that, like the base 45 depicted by FIG. 2, contacts the receiver 33 when the apparatus 125 is coupled to the weapon 22. In this regard, as described above, magnets may be used to couple the base 145 to the receiver 33 or other portion of the weapon 22. Also, the base 145 has holes 153 through which a strap (not shown in FIG. 22) may be used to secure the base 145 to the weapon 22, as described above for the decoy holding apparatus 25.

Figure 23:
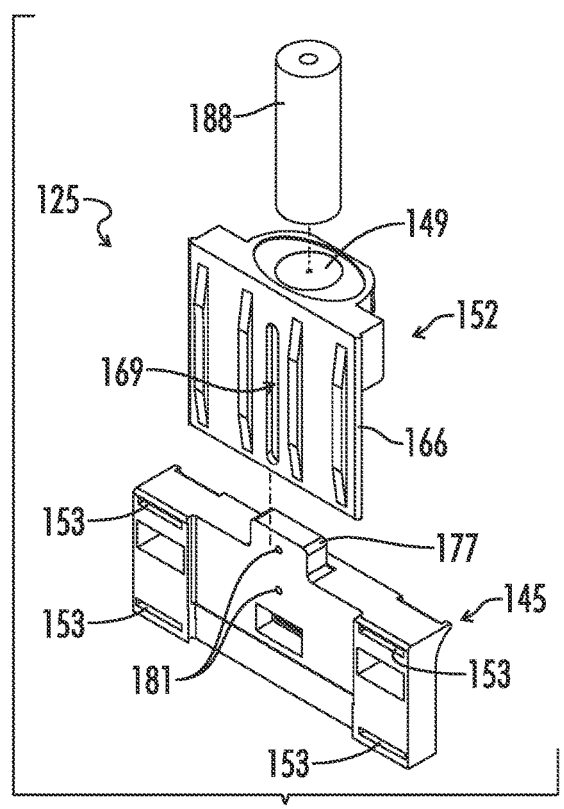
FIG. 23 is an exploded view illustrating the decoy holding apparatus depicted by FIG. 22.

As shown by FIGS. 22 and 23, the apparatus 125 has a movable support element 152 that has a platform 149 from which an insert 188 extends. A handle 44 or 144 may be mounted on the apparatus 125 by positioning the handle 44 or 144 such that the insert 188 passes through it, as described above for the decoy holding apparatus 25 and handle 44. The platform 149 is coupled to a panel 166 that has an elongated slot 169. The base 145 has a raised tab 177, and the bottom of the platform 149 has a hole (not shown) dimensioned for receiving the tab 177. In the embodiment depicted by FIG. 22, the bottom of the platform 149 rests on a top surface of the base 145 such that the tab 177 is inserted into the support element 152 and holds the support element 152 on the base 145. The base 145 has holes 181 for respectively receiving coupling mechanisms (not shown in FIG. 22), such as screws. In one exemplary embodiment, the surface of each hole 181 is preferably threaded for facilitating reception of its respective coupling mechanism. Note that the holes 181 are aligned with the slot 169 so that coupling mechanisms can pass through the slot 169 and into the holes 181. If desired, coupling mechanisms (not shown in FIG. 20) may be so inserted into the holes 181 through the slot 169 when the support element 152 is resting on the base 145.

Figure 24:
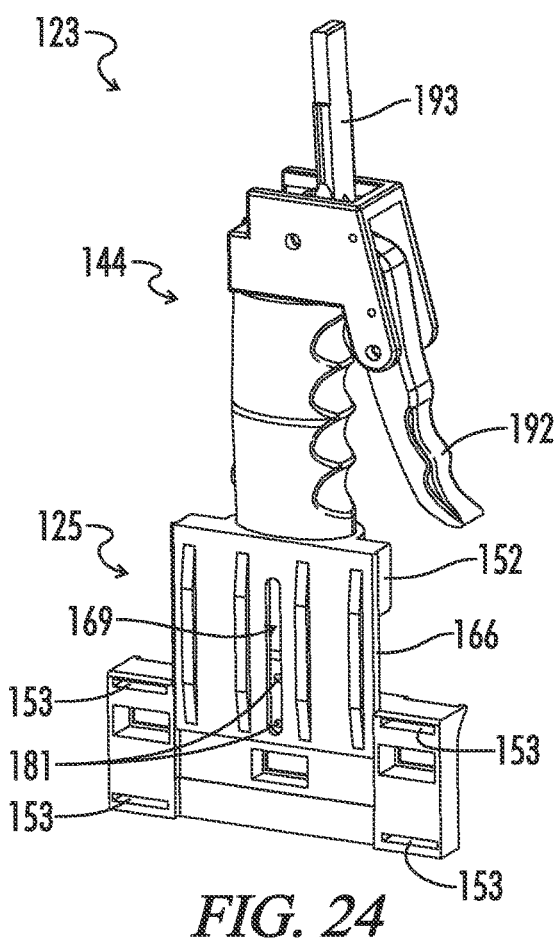
FIG. 24 is a three-dimensional perspective view illustrating the decoy articulation system depicted by FIG. 22 after a support element has been raised relative to the position of the support element in FIG. 22.
Figure 25:
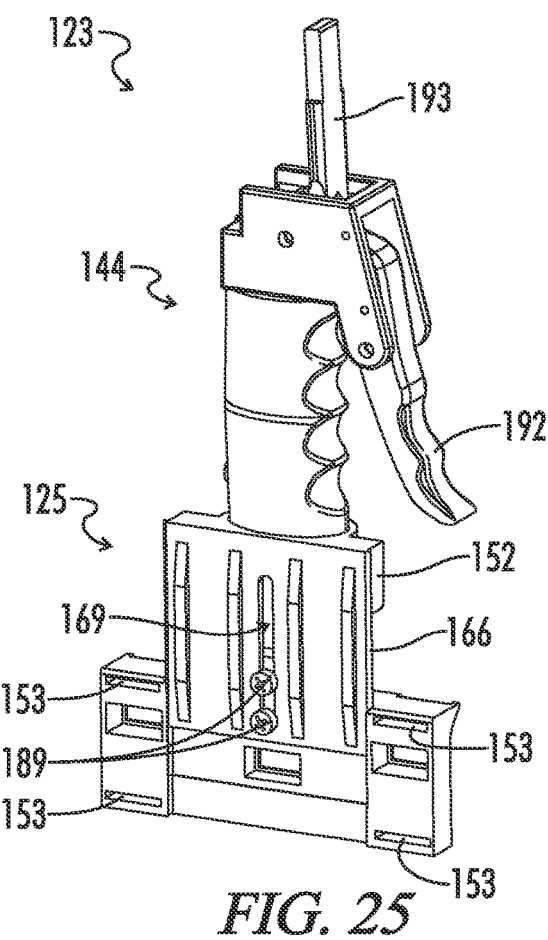
FIG. 25 is a three-dimensional perspective view illustrating the decoy articulation system depicted by FIG. 24 after a pair of coupling mechanisms have been inserted into the decoy holding apparatus.

Also, the support element 145 may be raised relative to the base 145, as shown by FIG. 24. In such configuration, the tab 177 may no longer be within the support element 152 for holding the support element 152 on the base 145. However, the support element 152 may be secured to the base 145 by passing coupling mechanisms 189, such as screws, into the holes 181 through the slot 169, as shown by FIG. 25. In such embodiment, the handle 144 is positioned higher relative to the weapon 22 on which the apparatus 125 is mounted. Such higher positioning of the handle 144 may better accommodate a scope (not shown) that is mounted on the weapon 22 for assisting the hunter or other user with aiming the weapon 22. As an example, the scope may be positioned on the weapon 22 such that it has a view through a space between the handle 144 and the weapon 22 without the handle 144 occluding such view.

In other embodiments, the decoy holding apparatus, decoy articulation system and decoy 77 can be mounted to a bow (e.g., a compound bow, recurve bow, longbow or crossbow) and used by a hunter for hunting turkeys. The decoy holding apparatus can be used to mount and hold the decoy 77 (and the decoy articulation system) on the bow being carried by the hunter. Since the decoy 77 is mounted to the bow, the hunter may approach a gobbler with the bow in a "ready-to-draw" position once the gobbler becomes fixated on the decoy 77. When the hunter reaches an advantageous position, the hunter can draw the bow, while still presenting the decoy 77 to the gobbler, to aim and take a shot at the gobbler. The decoy holding apparatus can be mounted to the bow such that the decoy 77 (and the decoy articulation system) does not interfere with the hunter's ability to draw the bow and aim at a gobbler.

Figure 26:
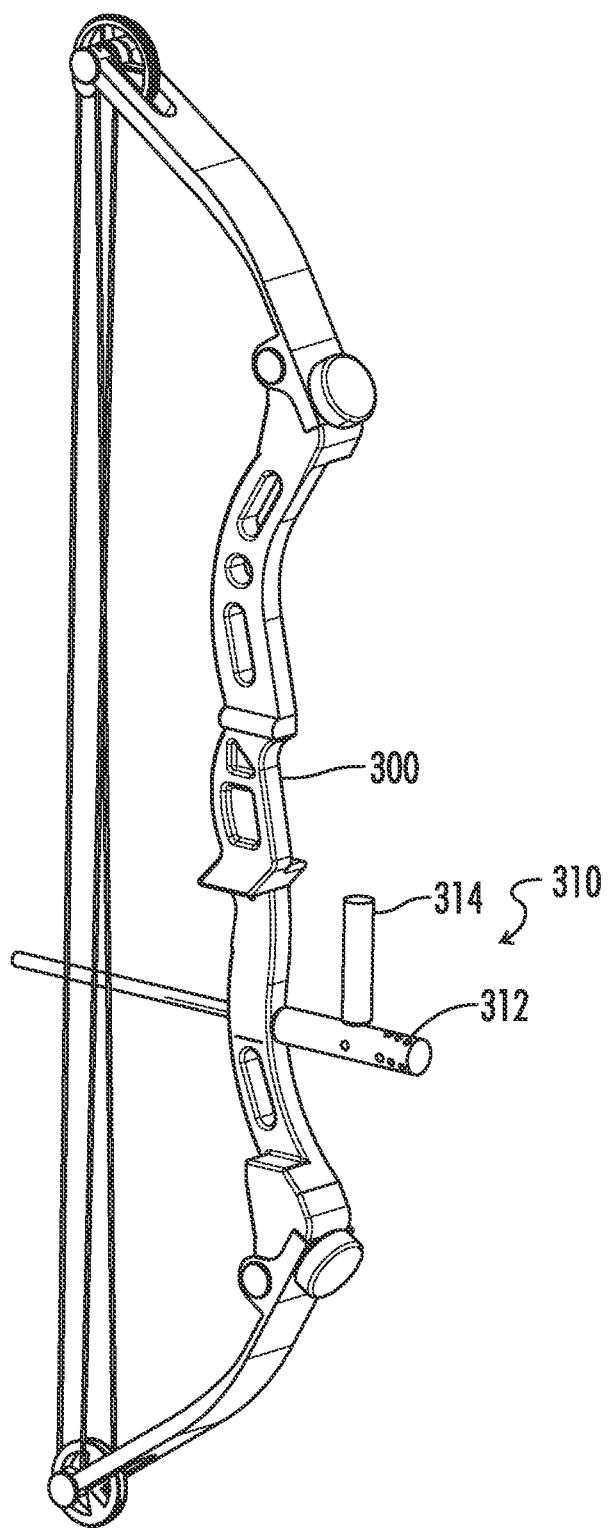
FIG. 26 is a three-dimensional front perspective view showing an embodiment of the decoy holding apparatus mounted on a bow.
Figure 27:
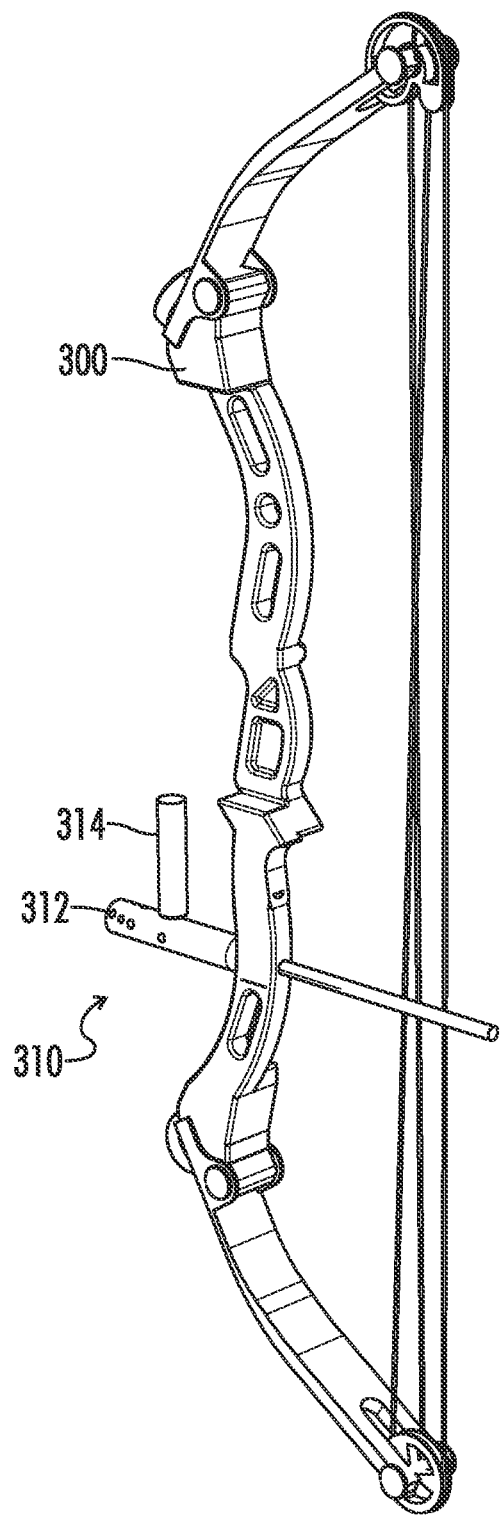
FIG. 27 is a three-dimensional rear perspective view showing an embodiment of the decoy holding apparatus of FIG. 26 mounted on a bow.
Figure 28:
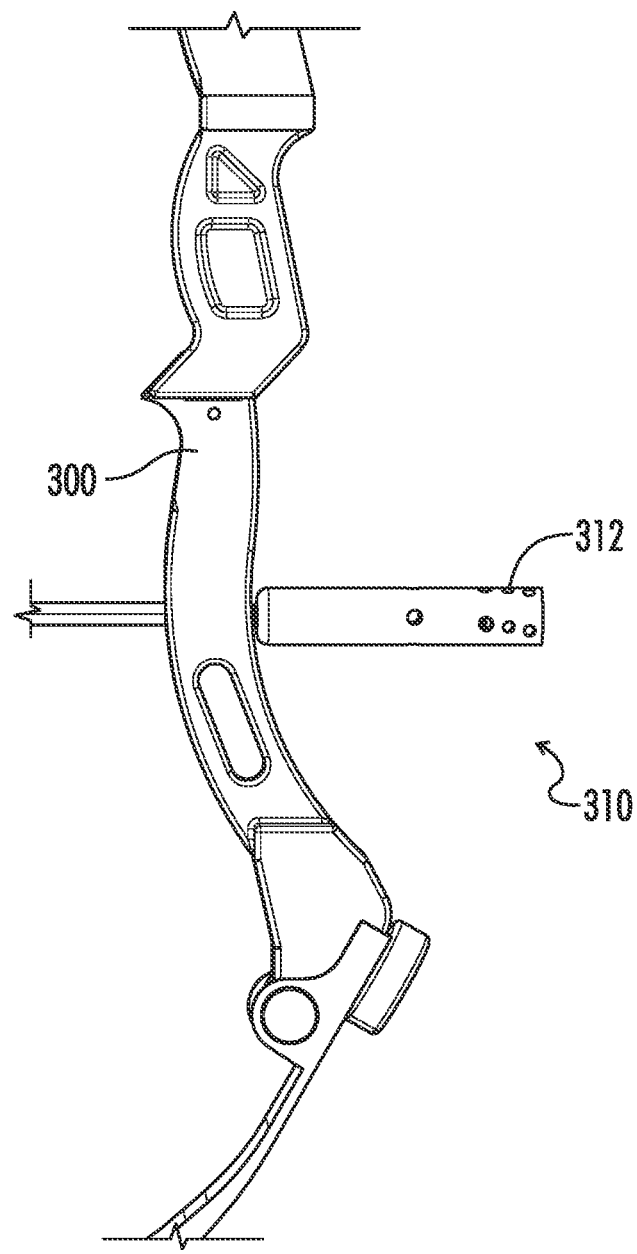
FIG. 28 is a side view of the base portion from the decoy holding apparatus of FIG. 26 mounted on the bow.

FIGS. 26-28 shows an embodiment of a decoy holding apparatus 310 mounted to a bow 300. The decoy holding apparatus 310 can be connected to the bow 300 and can extend away from the bow 300 in a direction that is opposed to the hunter holding the bow 300. In one embodiment, the decoy holding apparatus 310 can be connected to the bow 300 with a mechanical connection using threaded portions. In another embodiment, the decoy holding apparatus 310 may be connected to the bow 300 by straps passing through the decoy holding apparatus 310 and around the bow 300.

Figure 29:
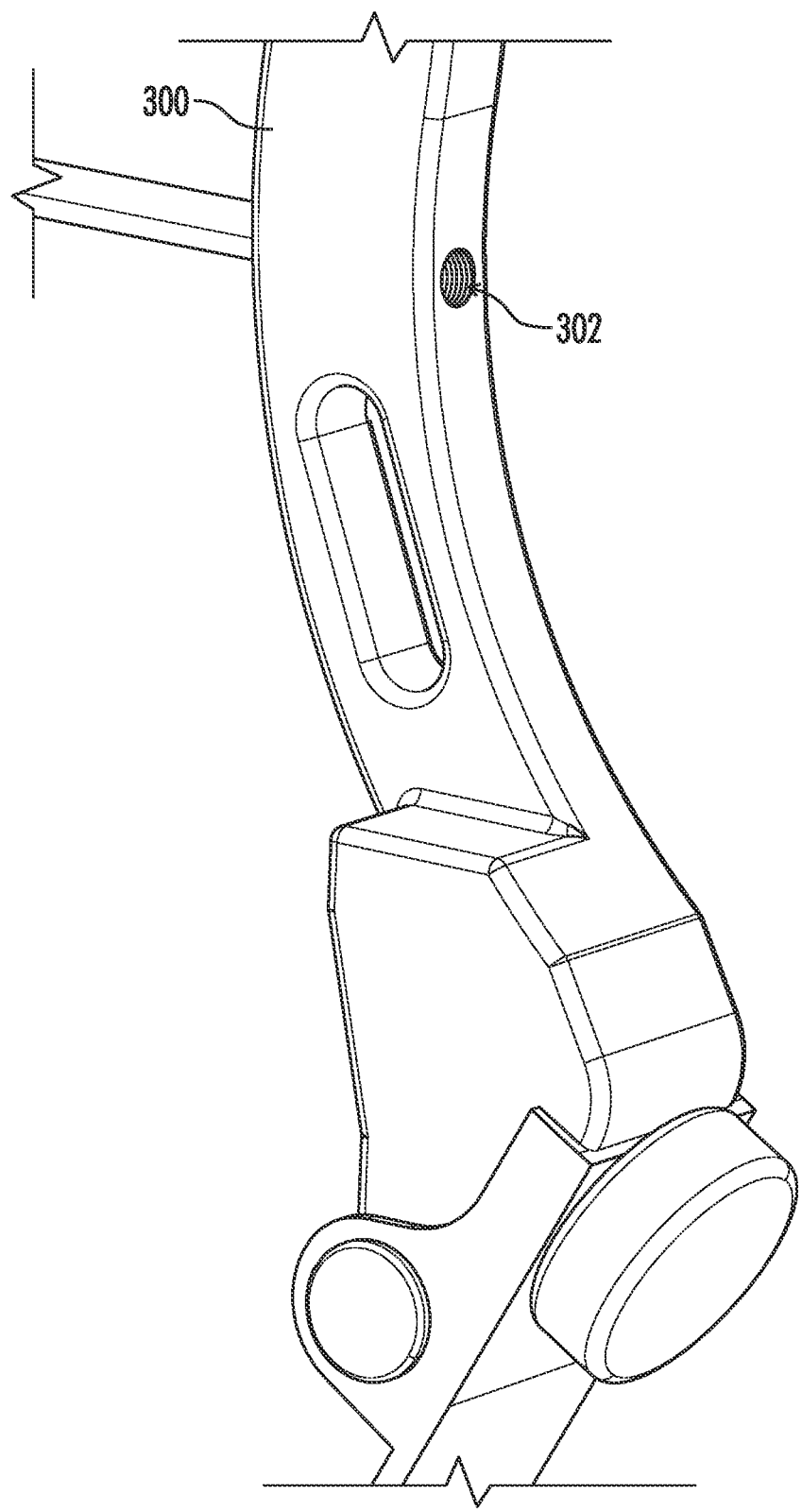
FIG. 29 is a front view showing an embodiment of a connection point on the bow for the decoy holding apparatus of FIG. 26.
Figure 30:
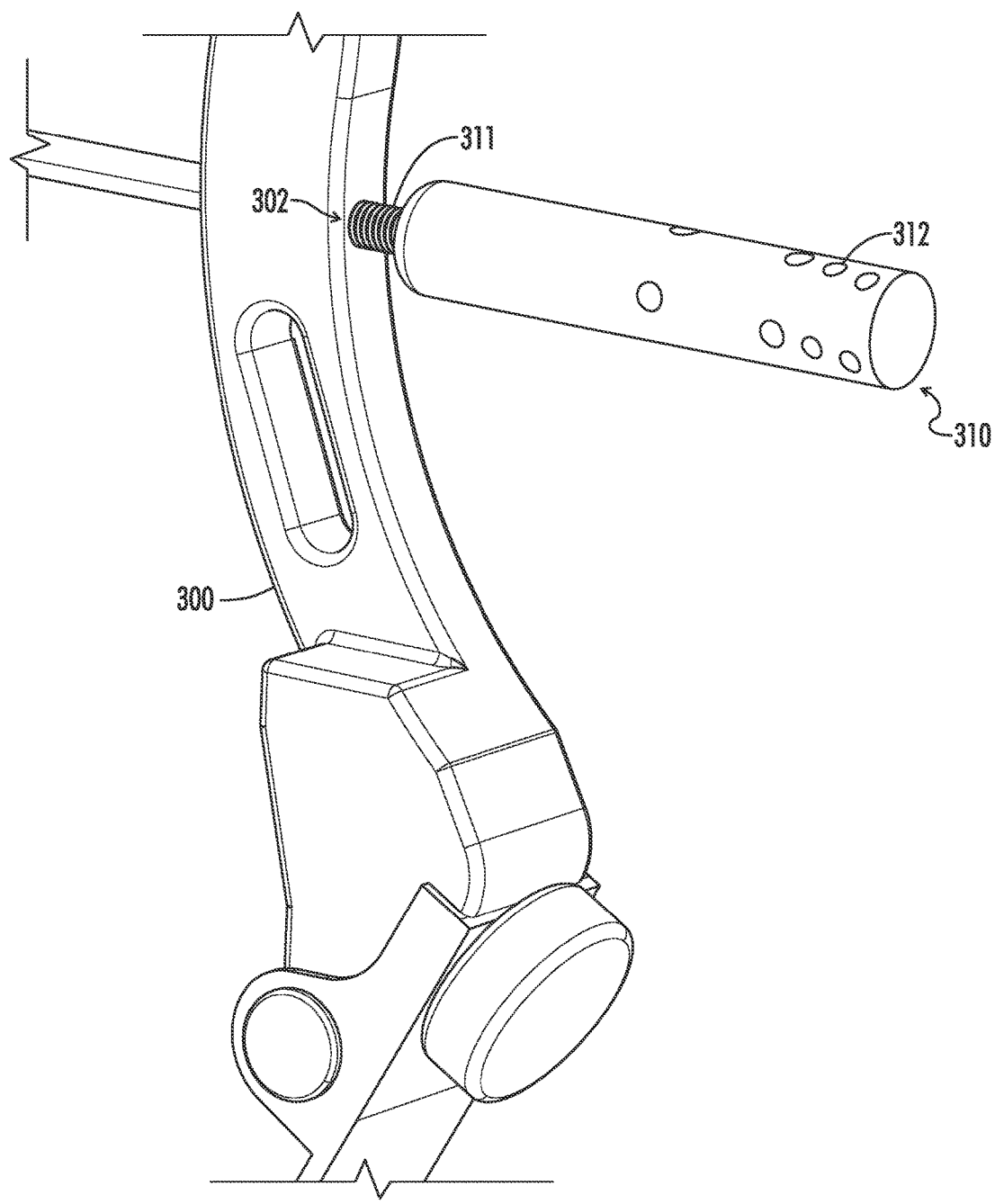
FIG. 30 is a front perspective view showing an embodiment of a portion of the decoy holding apparatus of FIG. 26 partially engaged with the bow.

As shown in FIG. 29, the bow 300 can include a connection point 302 (e.g., a threaded female connector) to receive a corresponding threaded male connector on the decoy holding apparatus 310. In an embodiment, the connection point 302 may correspond to a connection point used to attach a counterweight to the bow 300. The decoy holding apparatus 310 can include a threaded male connector 311 that engages with the threaded female connector at the connection point 302 of the bow 300 (as shown in FIG. 30) to secure the decoy holding apparatus 310 to the bow 300. In other embodiments, other types of mechanical connections can be used and may include mounting hardware on the bow 300 and/or the decoy holding apparatus 310, spring-loaded fasteners and/or mechanical fasteners such as bolts or screws. In still other embodiments, other types of connections (e.g., adhesive, magnetic, etc.) maybe used to connect the decoy holding apparatus 310 to the bow 300.

The decoy holding apparatus 310 can include a base 312 and an insert 314 that is connected to the base 312. The insert 314 can be connected to the base 312 using a threaded connection in one embodiment, but may be connected to the base 312 using any suitable connection technique. In one embodiment, the base 312 can have a substantially horizontal orientation as shown in FIGS. 26-28. However, in other embodiments, the base 312 may be angled in an upward or downward direction. The insert 314 can be positioned substantially perpendicular to the base 312 in one embodiment, but may be positioned at other angles in other embodiments.

In one embodiment, the insert 314 has a cylindrical shape similar to insert 88 described above, but other shapes are possible in other embodiments. The bottom of the handle 44 of decoy 77 has a hole 91 for receiving the insert 314. In this regard, when a hunter desires to mount the decoy 77 on the bow 300, the hunter moves the decoy 77 relative to the decoy holding apparatus 310 such that the insert 314 is inserted into the hole 91 until the decoy 77 rests on the decoy holding apparatus 310. Having the insert 314 inserted into the hole 91 helps to prevent the decoy 77 from falling off of the decoy holding apparatus 310. Thus, after positioning the decoy 77 on the decoy holding apparatus 310, the hunter can release the decoy 77 thereby freeing both of his hands for operating the bow 300. The hunter is able to move and position the decoy 77 on the decoy holding apparatus 310 in a manner similar to that described above for the decoy 77 and decoy holding apparatus 25.

Figure 31:
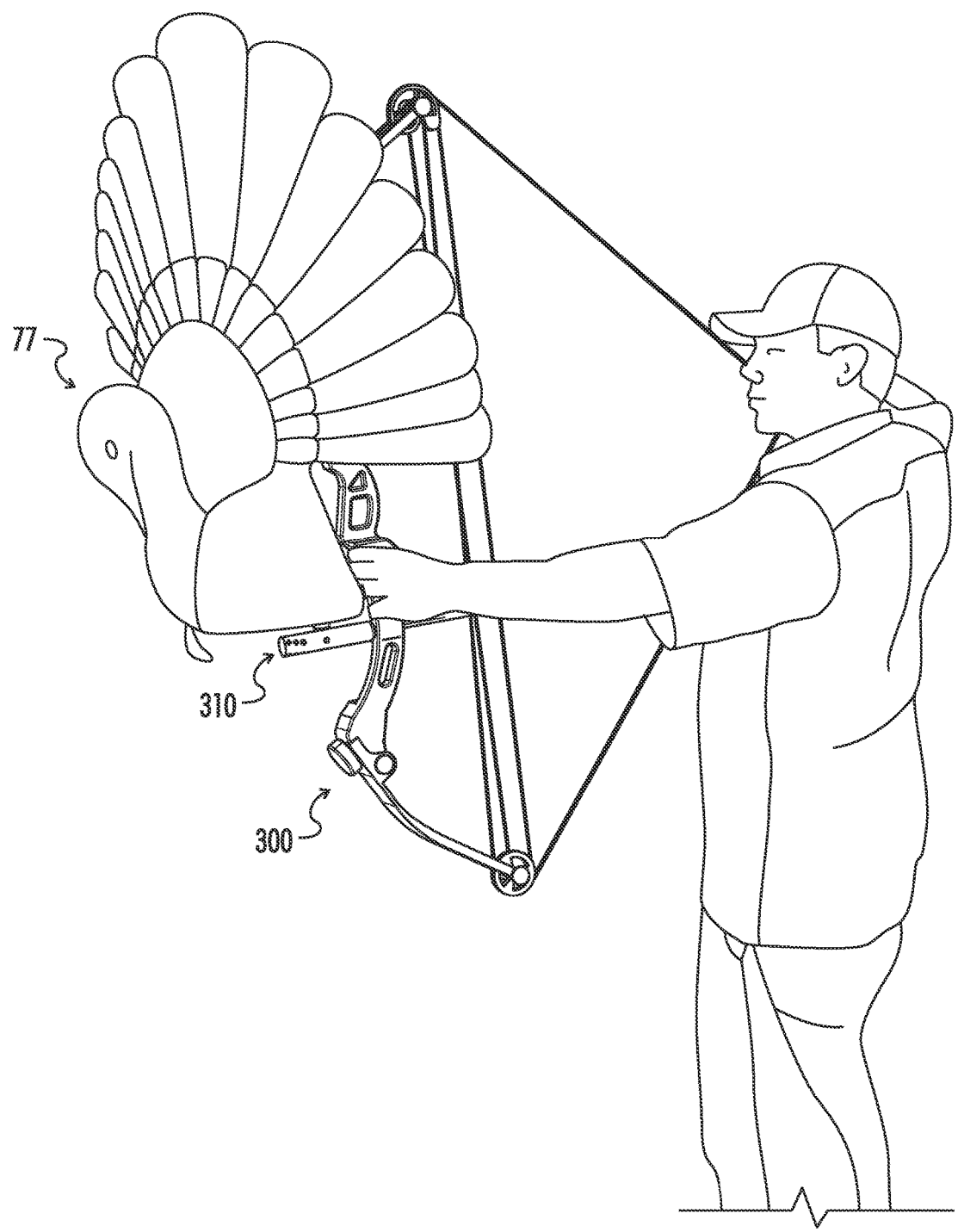
FIG. 31 is a three-dimensional side view showing an embodiment of a decoy mounted on a bow.
Figure 32:
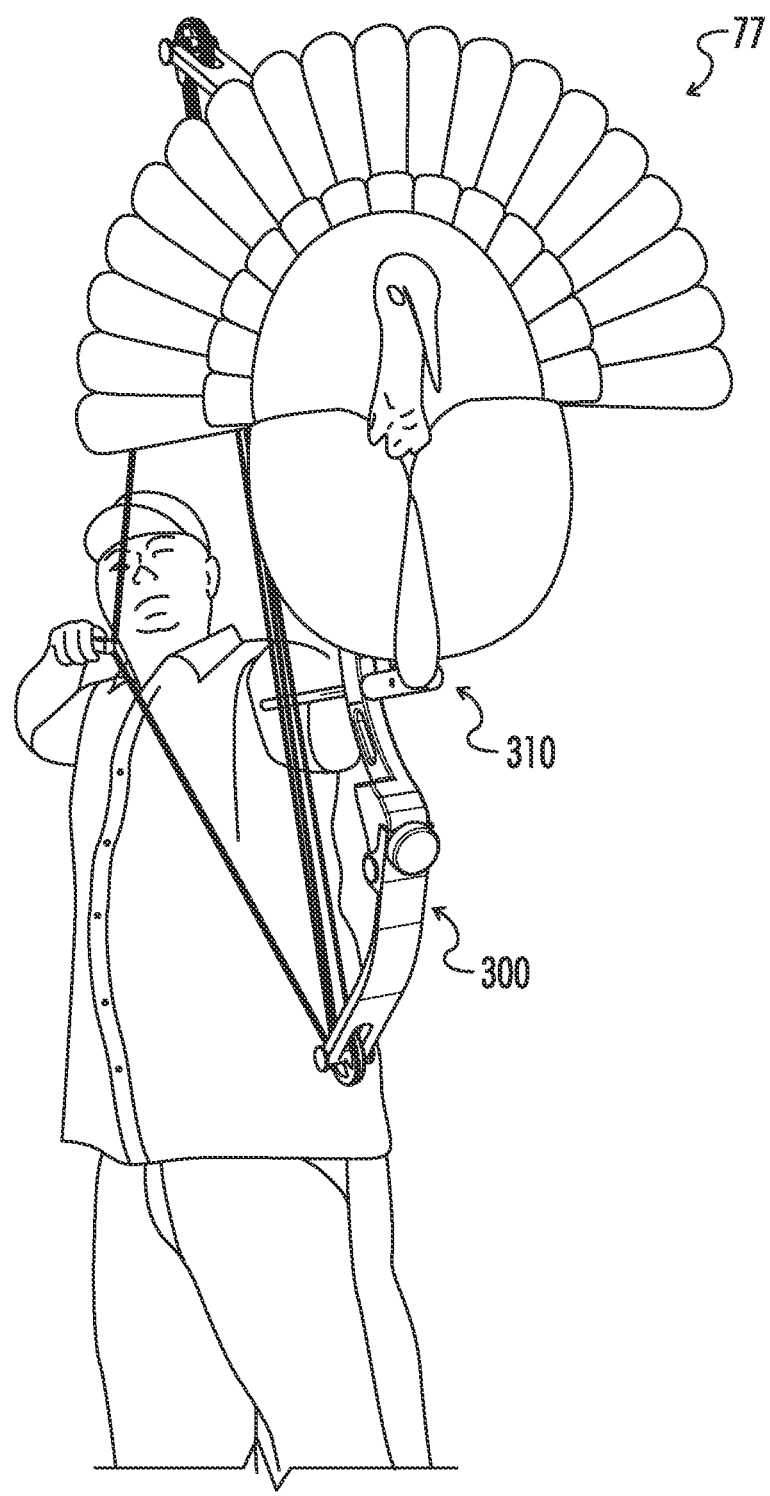
FIG. 32 is a three-dimensional front view showing an embodiment of a decoy mounted on a bow.
Figure 33:
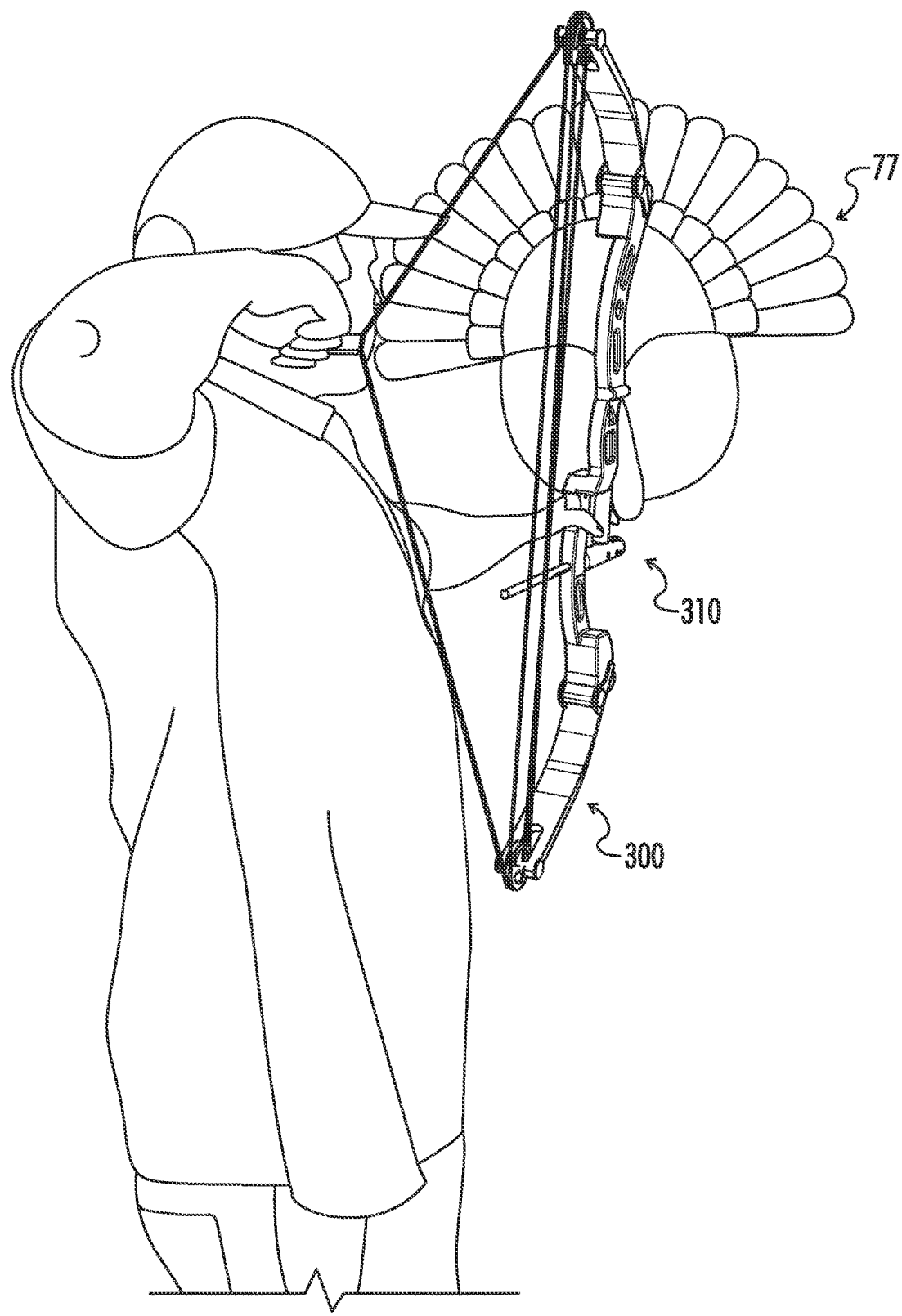
FIG. 33 is a three-dimensional rear view showing an embodiment of a decoy mounted on a bow.

As shown in FIGS. 31-33, the decoy 77 can be mounted on the decoy holding apparatus 310 and be presented to a gobbler while a hunter draws the bow 300. As described above, the hunter is able to move the decoy 77 (e.g., rotate the decoy 77 and/or tilt the fan 85 of the decoy 77) while holding the bow 300 in order to distract the gobbler from the hunter. The decoy 77, when mounted on the bow 300, can be used to conceal the hunter from the gobbler and provide a source of fixation for the gobbler as the hunter approaches the gobbler. The decoy 77 may be offset relative to the bow 300 to provide the hunter with a "line of sight" to the gobbler and so that the decoy 77 does not interfere with the process of shooting an arrow at the gobbler.

FIGS. 34-43 show different embodiments of a decoy holding apparatus for a bow 300. For simplicity, the insert 314 has been omitted from the decoy holding apparatuses shown in FIGS. 34-43, but it is to be understood that the insert 314 is part of the decoy holding apparatuses and would be connected to the corresponding base of a decoy holding apparatus as described in detail above. The decoy holding apparatuses shown in FIGS. 34-43 can be used to horizontally (e.g., laterally and/or longitudinally) and/or vertically displace or offset the decoy 77 from the bow 300. Specifically, the decoy 77 can be displaced from the connection point 302 on the bow 300 by the decoy holding apparatus.

FIGS. 34 and 35 show an embodiment of a decoy holding apparatus that can provide longitudinal displacement of the decoy 77 from the bow 300. The decoy holding apparatus 320 can include a base 322. The base 322 can have a substantially right circular cylinder shape in one embodiment, but may have different shapes in other embodiments. The base 322 can either be a solid cylinder or a hollow cylinder. In addition, if the base 322 is a hollow cylinder, some or all of the cylinder may be filled with one or more different materials to assist in the connection of the insert 314 to the base 322 as described below.

The decoy holding apparatus 320 can include a connection mechanism 321 extending from or attached to an end of the base 322. The connection mechanism 321 can engage with the bow 300 at connection point 302 (or a corresponding structure on the bow 300) to connect the base 322 to the bow 300. In one embodiment, the connection mechanism 321 can be a male threaded connector, as shown in FIG. 34, that can engage with the female threaded connector at the connection point 302 on the bow 300 shown in FIG. 29. In other embodiments, the connection mechanism 321 can include other suitable devices or mechanisms to permit the decoy holding apparatus 320 to be connected to the bow 300 (or corresponding structure on the bow 300).

The base 322 can include a connection system (shown as apertures 324, 326 in FIG. 34) to connect the insert 314 to the base 322. The insert 314 can include a male connection member (e.g., a threaded male connector) that can engage with a corresponding aperture 324, 326 to connect the insert 314 to the base 322. While apertures 324, 326 are shown in FIG. 34 as the connection system to connect the insert 314 to the base 322, the base 322 may include other types of connection systems to connect the insert 314 to the base 322 in other embodiments.

The apertures 324, 326 can be placed at different positions along the length of the base 322 to provide for different longitudinal displacements of the decoy 77 from the bow 300 when the decoy 77 is mounted on the insert 314 engaged with an individual aperture 324, 326. When the base 322 is connected to the bow 300, apertures 324 can be used to position the insert 314 (and the decoy 77) in a substantially vertical position (as shown in FIGS. 26 and 27) relative to the horizontal plane of the base 322. Apertures 326 can be used to position the insert 314 (and the decoy 77) at an angle (e.g., 15°, 30°, 45°, 60°, 75°, etc.) relative to the horizontal plane of the base 322. While the embodiment of FIG. 34 shows two apertures 324 and four apertures 326 in base 322, it is to be understood that the base 322 can have any number of apertures 324 or apertures 326 depending on the length and circumference of the base 322 and the number of different connection options for the insert 314 to be provided by the base 322.

FIGS. 36 and 37 show an embodiment of a decoy holding apparatus that can provide longitudinal and lateral displacement of the decoy 77 from the bow 300. The decoy holding apparatus 330 can be similar to the decoy holding apparatus 320 of FIG. 34 except that the decoy holding apparatus 330 also includes a horizontal extension 333 positioned between the base 322 and the bow 300. The horizontal extension 333 can be used to provide lateral displacement of the decoy 77 from the bow 300. The horizontal extension 333 can have a substantially square prism shape in one embodiment, but may have different shapes in other embodiments. The horizontal extension 333 can either be a solid prism or a hollow prism.

The horizontal extension 333 can include a connection mechanism 321 extending from or attached to one end of the horizontal extension 333. The connection mechanism 321 can engage with the bow 300 (or a corresponding structure on the bow 300) to connect the horizontal extension 333 (and decoy holding apparatus 330) to the bow 300. The base 322 can be connected to the horizontal extension 333 at an end of the horizontal extension 333 opposite the connection mechanism 321 and on an opposed side to the connection mechanism 321. The connection of the base 322 opposite the connection mechanism 321 can provide the lateral displacement of the decoy 77 from the bow 300. The horizontal extension 333 can be configured to extend to either the left or the right of the connection mechanism 321 in order to provide the desired lateral displacement for the decoy 77.

In one embodiment, the base 322 and the horizontal extension 333 can be a unitary structure. However, in other embodiments, the base 322 and the horizontal extension 333 can be separate components of the decoy holding apparatus 330 that can either be fixedly connected together or detachably connected together (e.g., the base 322 can be detached and reattached to the horizontal extension 333). In one embodiment, if the base 322 is detachably connected to the horizontal extension 333 via a connection mechanism 321, the base 322 may use the connection mechanism 321 to connect to either the horizontal extension 333 or the bow 300, if the hunter desires to change the configuration of the decoy holding apparatus 330 to that of decoy holding apparatus 320.

Figure 38:
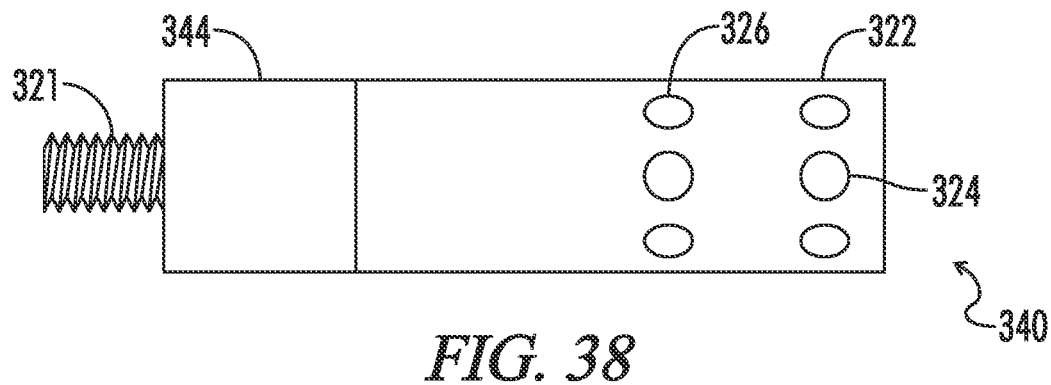
FIGS. 38 and 39 are top and front views of a further embodiment of a portion of a decoy holding apparatus for a bow.
Figure 39:
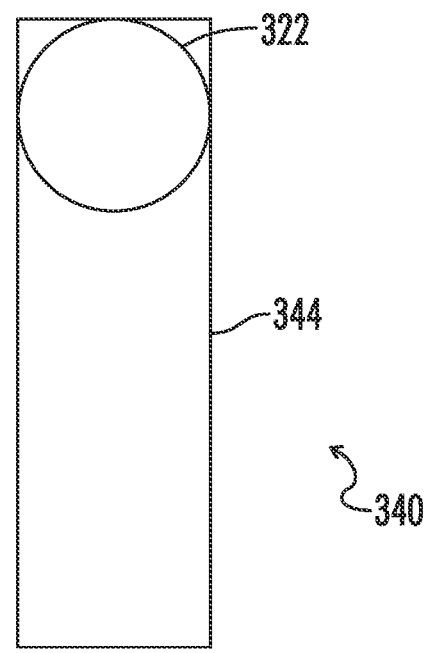

FIGS. 38 and 39 show an embodiment of a decoy holding apparatus that can provide longitudinal and vertical displacement of the decoy 77 from the bow 300. The decoy holding apparatus 340 can be similar to the decoy holding apparatus 320 of FIG. 34 except that the decoy holding apparatus 340 also includes a vertical extension 344 positioned between the base 322 and the bow 300. The vertical extension 344 can be used to provide vertical displacement of the decoy 77 from the connection point 302 of the bow 300. The vertical extension 344 can have a substantially square prism shape in one embodiment, but may have different shapes in other embodiments. The vertical extension 344 can either be a solid prism or a hollow prism.

The vertical extension 344 can include a connection mechanism 321 extending from or attached to one end of the vertical extension 344. The connection mechanism 321 can engage with the bow 300 (or a corresponding structure on the bow 300) to connect the vertical extension 344 (and decoy holding apparatus 340) to the bow 300. The base 322 can be connected to the vertical extension 344 at an end of the vertical extension 344 opposite the connection mechanism 321 and on an opposed side to the connection mechanism 321. The connection of the base 322 opposite the connection mechanism 321 can provide the vertical displacement of the decoy 77 from the bow 300. The vertical extension 344 can be configured to extend either up or down from the connection mechanism 321 in order to provide the desired vertical displacement for the decoy 77.

In one embodiment, the base 322 and the vertical extension 344 can be a unitary structure. However, in other embodiments, the base 322 and the vertical extension 344 can be separate components of the decoy holding apparatus 340 that can either be fixedly connected together or detachably connected together (e.g., the base 322 can be detached and reattached to the vertical extension 344). In one embodiment, if the base 322 is detachably connected to the vertical extension 344 via a connection mechanism 321, the base 322 may use the connection mechanism 321 to connect to either the vertical extension 344 or the bow 300, if the hunter desires to change the configuration of the decoy 340 holding apparatus to that of decoy holding apparatus 320.

Figure 40:
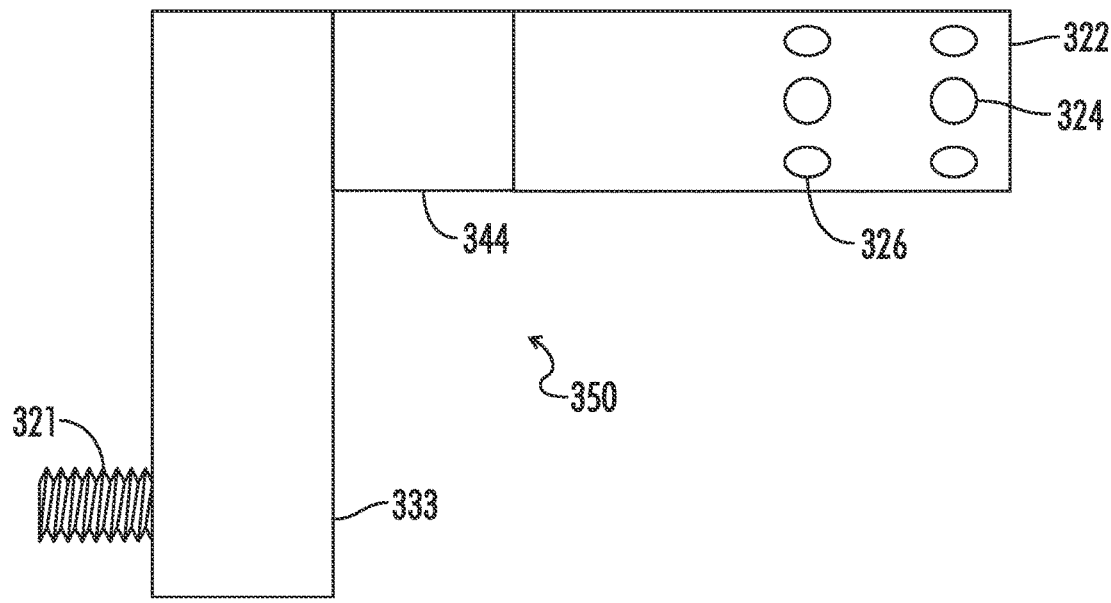
FIGS. 40 and 41 are top and front views of an additional embodiment of a portion of a decoy holding apparatus for a bow.
Figure 41:
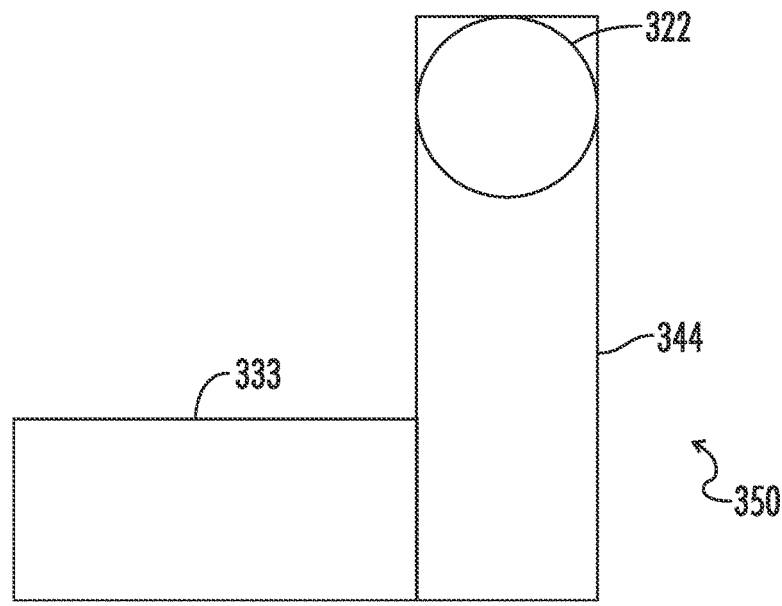

FIGS. 40 and 41 show an embodiment of a decoy holding apparatus that can provide longitudinal, lateral and vertical displacement of the decoy 77 from the bow 300. The decoy holding apparatus 350 can be similar to the decoy holding apparatus 320 of FIG. 34 except that the decoy holding apparatus 350 also includes a horizontal extension 333 and a vertical extension 344 positioned between the base 322 and the bow 300. The horizontal extension 333 can be used to provide lateral displacement of the decoy 77 from the bow 300. The vertical extension 344 can be used to provide vertical displacement of the decoy 77 from the connection point 302 of the bow 300. The horizontal extension 333 and the vertical extension 344 can each have a substantially square prism shape in one embodiment, but may have different shapes in other embodiments. The horizontal extension 333 and the vertical extension 344 can each either be a solid prism or a hollow prism.

The horizontal extension 333 can include a connection mechanism 321 extending from or attached to one end of the horizontal extension 333. The connection mechanism 321 can engage with the bow 300 (or a corresponding structure on the bow 300) to connect the horizontal extension potion 333 (and decoy holding apparatus 350) to the bow 300. The vertical extension 344 can be connected to the horizontal extension 333 at an end of the horizontal extension 333 opposite the end with the connection mechanism 321 and on an opposed side to the connection mechanism 321. The connection of the vertical extension 344 opposite the connection mechanism 321 can provide the lateral displacement of the decoy 77 from the bow 300. The base 322 can be connected to the vertical extension 344 at an end of the vertical extension 344 opposite the end of the vertical extension 344 connected to the horizontal extension 333. The connection of the base 322 to the vertical extension 344 opposite the connection with the horizontal extension 333 can provide the vertical displacement of the decoy 77 from the bow 300. The horizontal extension 333 can be configured to extend to either the left or the right of the connection mechanism 321 in order to provide the desired lateral displacement for the decoy 77. The vertical extension 344 can be configured to extend either up or down from the connection with the horizontal extension 333 in order to provide the desired vertical displacement for the decoy 77.

In one embodiment, the base 322, the horizontal extension 333 and the vertical extension 344 can be a unitary structure. However, in other embodiments, the base 322, the horizontal extension 333 and the vertical extension 344 can each be separate components of the decoy holding apparatus 350 that can either be fixedly connected together or detachably connected together (e.g., the base 322 can be detached and reattached to the vertical extension 344 or the vertical extension 344 can be detached and reattached to the horizontal extension 333). In one embodiment, if the base 322 is detachably connected to the vertical extension 344 via a connection mechanism 321, the base 322 may use the connection mechanism 321 to connect to either the vertical extension 344, the bow 300 or the horizontal extension 333, if the hunter desires to change the configuration of the decoy holding apparatus 350 to that of decoy holding apparatus 320 or decoy holding apparatus 330.

Figure 42:
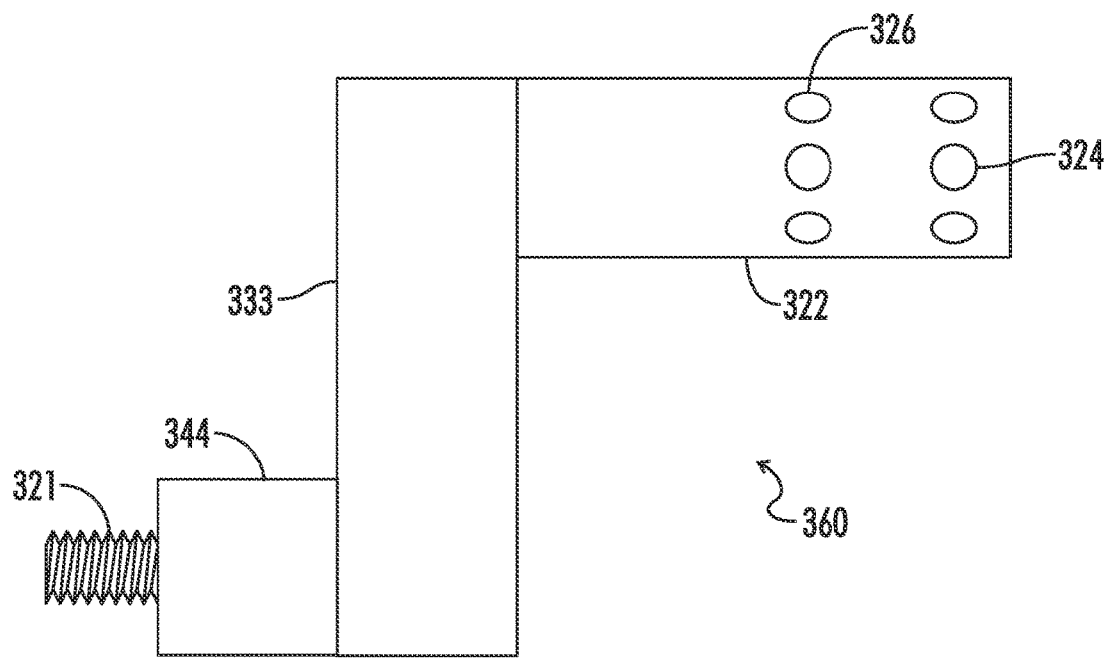
FIGS. 42 and 43 are top and front views of a still further embodiment of a portion of a decoy holding apparatus for a bow.
Figure 43:
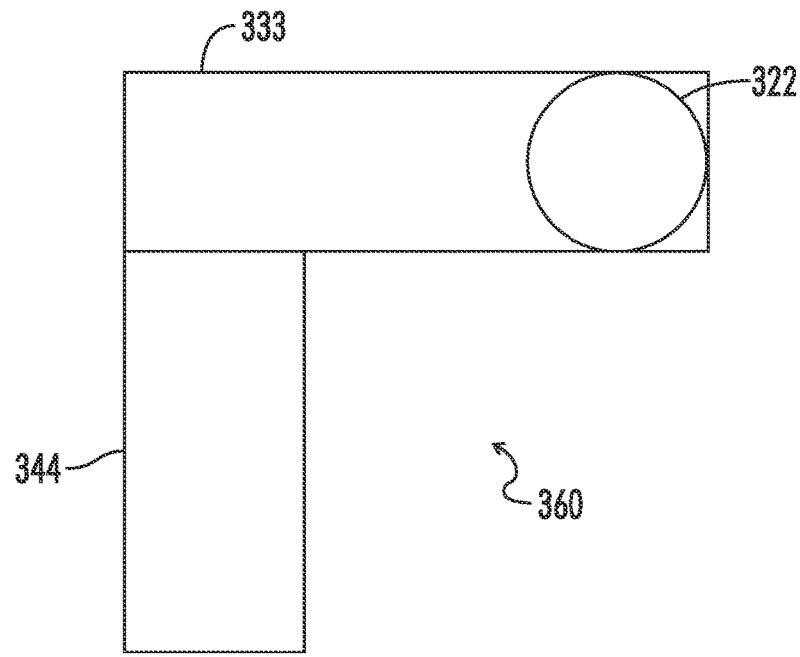

FIGS. 42 and 43 show an embodiment of a decoy holding apparatus that can provide longitudinal, lateral and vertical displacement of the decoy 77 from the bow 300. The decoy holding apparatus 360 can be similar to the decoy holding apparatus 320 of FIG. 34 except that the decoy holding apparatus 360 also includes a horizontal extension 333 and a vertical extension 344 positioned between the base 322 and the bow 300. The horizontal extension 333 can be used to provide lateral displacement of the decoy 77 from the bow 300. The vertical extension 344 can be used to provide vertical displacement of the decoy 77 from the connection point 302 of the bow 300. The horizontal extension 333 and the vertical extension 344 can each have a substantially square prism shape in one embodiment, but may have different shapes in other embodiments. The horizontal extension 333 and the vertical extension 344 can each either be a solid prism or a hollow prism.

The vertical extension 344 can include a connection mechanism 321 extending from or attached to one end of the vertical extension 344. The connection mechanism 321 can engage with the bow 300 (or a corresponding structure on the bow 300) to connect the vertical extension 344 (and decoy holding apparatus 360) to the bow 300. The horizontal extension 333 can be connected to the vertical extension 344 at an end of the vertical extension 344 opposite the end with the connection mechanism 321. The connection of the horizontal extension 333 opposite the connection mechanism 321 can provide the vertical displacement of the decoy 77 from the bow 300. The base 322 can be connected to the horizontal extension 333 at an end of the horizontal extension 333 opposite the end connected to the vertical extension 344. The connection of the base 322 to the horizontal extension 333 opposite the connection with the vertical extension 344 can provide the lateral displacement of the decoy 77 from the bow 300. The vertical extension 344 can be configured to extend either up or down from the connection mechanism 321 in order to provide the desired vertical displacement for the decoy 77. The horizontal extension 333 can be configured to extend to either the left or the right of the connection with the vertical extension 344 in order to provide the desired lateral displacement for the decoy 77.

In one embodiment, the base 322, the horizontal extension 333 and the vertical extension 344 can be a unitary structure. However, in other embodiments, the base 322, the horizontal extension 333 and the vertical extension 344 can each be separate components of the decoy holding apparatus 360 that can either be fixedly connected together or detachably connected together (e.g., the base 322 can be detached and reattached to the horizontal extension 333 or the horizontal extension 333 can be detached and reattached to the vertical extension 344). In one embodiment, if the base 322 is detachably connected to the horizontal extension 333 via a connection mechanism 321, the base 322 may use the connection mechanism 321 to connect to either the horizontal extension 333, the bow 300 or the vertical extension 344, if the hunter desires to change the configuration of the decoy holding apparatus 360 to that of decoy holding apparatus 320 or decoy holding apparatus 340.

In one embodiment, the decoy holding apparatus can be configured to be connected to a counterweight that is attached to the bow 300. The decoy holding apparatus can be attached to the counterweight in any suitable manner to permit the desired longitudinal, lateral and/or vertical displacements from the bow 300.

In another embodiment, the vertical extension 344 and the horizontal extension 333 can have the same configuration and be used interchangeably. The vertical positioning or the horizontal positioning of the extension can be obtained depending on how the corresponding connection mechanism 321 of the extension is engaged with the bow 300 (or other extension).

In an embodiment, the configurations of the decoy holding apparatuses of FIGS. 26-43 can be adapted for use on other types of weapons (e.g., a rifle or shotgun). Vertical and/or horizontal extensions can be used with decoy holding apparatus 25 to displace the decoy 77 vertically and/or horizontally with respect to the weapon. The displacement of the decoy 77 with respect to the weapon can remove the decoy 77 from the "line of sight" of the hunter when aiming at a gobbler.

It should be noted that the various embodiments described herein are exemplary, and various changes and modifications to the disclosed embodiments would be apparent to a person of ordinary skill upon reading this disclosure. As an example, it is possible to secure a decoy holding apparatus to a weapon by inserting pins through the decoy holding apparatus into the weapon. In addition, it is unnecessary for a hunter to wait until a gobbler is fixated on the decoy before mounting the decoy 77 on the weapon 22. For example, a hunter may begin a hunt with the decoy 77 mounted on the weapon 22 and, if desired, articulate the decoy 77 during the hunt while it is mounted on the weapon 22. Various other techniques for securing a decoy holding apparatus to a weapon, mounting a decoy on a weapon, or using the decoy to hunt turkeys are possible.

Now, therefore, the following is claimed:

1. A weapon system, comprising:
   a weapon;
   a decoy holding apparatus coupled to the weapon at a connection point;
   a turkey decoy coupled to the decoy holding apparatus; and
   wherein the decoy holding apparatus is configured to provide at least one of a vertical displacement or a horizontal displacement of the turkey decoy with respect to the connection point.

2. The weapon system of claim 1, wherein the weapon comprises a bow.

3. The weapon system of claim 1, wherein the decoy holding apparatus comprises a horizontal extension configured to provide a horizontal displacement of the turkey decoy from the connection point such that a user of the weapon is able to aim the weapon while the turkey decoy is coupled to the decoy holding apparatus.

4. The weapon system of claim 3, wherein the decoy holding apparatus further comprises a vertical extension configured to provide a vertical displacement of the turkey decoy from the connection point such that a user of the weapon is able to aim the weapon at a turkey while the turkey decoy is coupled to the decoy holding apparatus.

5. The weapon system of claim 1, wherein the decoy holding apparatus comprises a vertical extension configured to provide a vertical displacement of the turkey decoy from the connection point such that a user of the weapon is able to aim the weapon at a turkey while the turkey decoy is coupled to the decoy holding apparatus.

6. The weapon system of claim 1, wherein the decoy holding apparatus is coupled to the weapon by a threaded connection.

7. The weapon system of claim 1, wherein the decoy holding apparatus comprises:
   a base; and
   an insert coupled to the base, wherein the turkey decoy is coupled to the insert.

8. The weapon system of claim 7, wherein the position of the insert is adjustable relative to the base.

9. A weapon system, comprising:
   a bow comprising a connection point;
   a decoy holding apparatus coupled to the bow at the connection point;
   a turkey decoy coupled to the decoy holding apparatus; and
   wherein the decoy holding apparatus is configured to provide at least one of a vertical displacement or a horizontal displacement of the turkey decoy with respect to the connection point.

10. The weapon system of claim 9, wherein the bow comprises one of a compound bow, longbow, recurve bow or crossbow.

11. The weapon system of claim 9, wherein the decoy holding apparatus further comprises:
    a base, the base configured to extend longitudinally from the connection point; and
    an insert coupled to the base, wherein the turkey decoy is coupled to the insert.

12. The weapon system of claim 11, wherein the base comprises a connection system, the connection system configured to permit the insert to be coupled to the base in a plurality of positions.

13. The weapon system of claim 12, wherein the plurality of positions include a plurality of longitudinal positions along the base and a plurality of angular positions around the base.

14. The weapon system of claim 11, wherein the decoy holding apparatus further comprises a horizontal extension connected between the base and the connection point, the horizontal extension configured to extend laterally from the connection point such that a user is able to aim the bow while the turkey decoy is coupled to the decoy holding apparatus.

15. The weapon system of claim 14, wherein the decoy holding apparatus further comprises a vertical extension coupled between the horizontal extension and the base, the vertical extension configured to extend vertically from the horizontal extension such that a user is able to aim the bow while the turkey decoy is coupled to the decoy holding apparatus.

16. The weapon system of claim 11, wherein the decoy holding apparatus further comprises a vertical extension coupled between the connection point and the base, the vertical extension configured to extend vertically from the connection point such that a user is able to aim the bow while the turkey decoy is coupled to the decoy holding apparatus.

17. The weapon system of claim 16, wherein the decoy holding apparatus further comprises a horizontal extension coupled between the vertical extension and the base, the horizontal extension configured to extend laterally from the vertical extension such that a user is able to aim the bow while the turkey decoy is coupled to the decoy holding apparatus.

18. The weapon system of claim 11, wherein the base comprises a connection mechanism configured to engage the connection point on the bow.

19. The weapon system of claim 18, wherein the connection mechanism comprises a threaded male connector and the connection point comprises a threaded female connector.

20. The weapon system of claim 9, further comprising a decoy articulation system coupled to the turkey decoy, wherein the decoy articulation system is responsive to user input for articulating at least a fan of the turkey decoy.

* * * * *